United States Patent
Lee et al.

(10) Patent No.: US 8,218,667 B2
(45) Date of Patent: Jul. 10, 2012

(54) DATA TRANSMISSION METHOD USING DIRTY PAPER CODING IN MIMO SYSTEM

(75) Inventors: Wook Bong Lee, Anyang-si (KR); Bin Chul Ihm, Anyang-si (KR); Moon Il Lee, Anyang-si (KR); Hyun Soo Ko, Anyang-si (KR); Jae Wan Kim, Anyang-si (KR); Jin Young Chun, Anyang-si (KR)

(73) Assignee: LG Electronics Inc., Seoul (KR)

( * ) Notice: Subject to any disclaimer, the term of this patent is extended or adjusted under 35 U.S.C. 154(b) by 483 days.

(21) Appl. No.: 12/311,286

(22) PCT Filed: Nov. 15, 2007

(86) PCT No.: PCT/KR2007/005723
§ 371 (c)(1),
(2), (4) Date: Mar. 25, 2009

(87) PCT Pub. No.: WO2008/060105
PCT Pub. Date: May 22, 2008

(65) Prior Publication Data
US 2009/0274235 A1    Nov. 5, 2009

(30) Foreign Application Priority Data

Nov. 15, 2006 (KR) .................. 10-2006-0112588
Mar. 20, 2007 (KR) .................. 10-2007-0026945
Mar. 21, 2007 (KR) .................. 10-2007-0027462
Mar. 23, 2007 (KR) .................. 10-2007-0028699

(51) Int. Cl.
*H04L 1/02* (2006.01)

(52) U.S. Cl. .................. 375/267

(58) Field of Classification Search .................. 375/267, 375/259, 347, 348, 349, 296, 992; 455/69, 455/214, 337, 450; 370/334
See application file for complete search history.

(56) References Cited

U.S. PATENT DOCUMENTS

| 6,937,843 B2 * | 8/2005 | Foschini et al. .................. 455/1 |
| 7,006,795 B2 | 2/2006 | Foschini et al. |
| 2005/0043031 A1 * | 2/2005 | Cho et al. .................. 455/450 |

FOREIGN PATENT DOCUMENTS
KR    10-2006-0077800    7/2006

OTHER PUBLICATIONS

Jindal, Nihar et al., "Dirty-Paper Coding Versus TDMA for MIMO Broadcast Channels," IEEE Transaction on Information Theory, vol. 51, No. 5, May 2005, pp. 1783-1794.

Kobayashi, Mari, "Joint Beamforming and Scheduling for a MIMO Downlink with Random Arrivals," Information Symposium on Information Theory 2006, Seattle, USA, Jul. 9-14, 2006, pp. 1442-1446.

* cited by examiner

*Primary Examiner* — Khai Tran
(74) *Attorney, Agent, or Firm* — McKenna Long & Aldrige LLP

(57) ABSTRACT

A data transmission method for multiple users having multiple receive antennas is provided. The method includes selecting a receive antenna among the multiple receive antennas for each user, performing DPC (Dirty Paper Coding) from the multiple transmit antennas to the receive antenna and transmitting a transmission signal on which the DPC is performed. Since DPC is implemented through a receive antenna selected among multiple receive antennas, complexity is not much increased although the DPC is applied to a MIMO system.

7 Claims, 15 Drawing Sheets

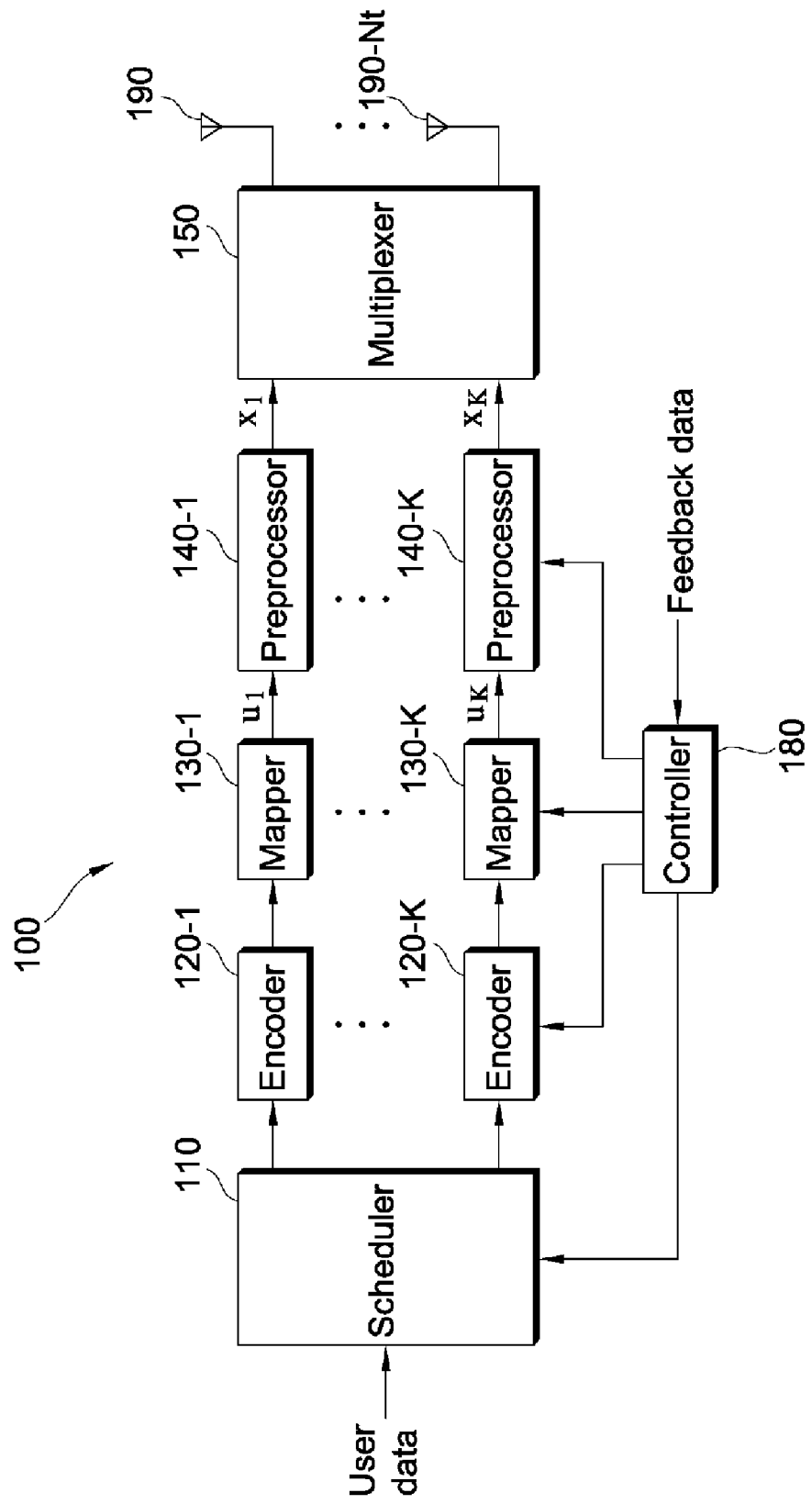
[Fig. 1]

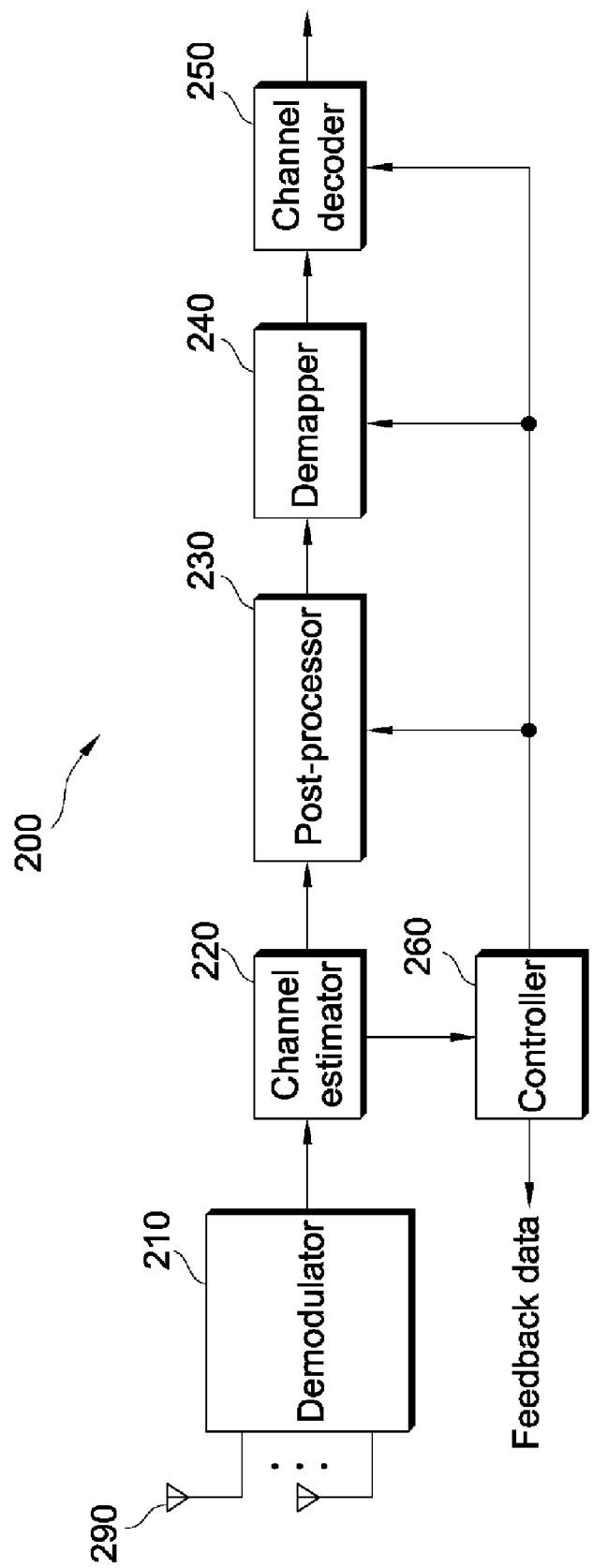
[Fig. 2]

[Fig. 3]
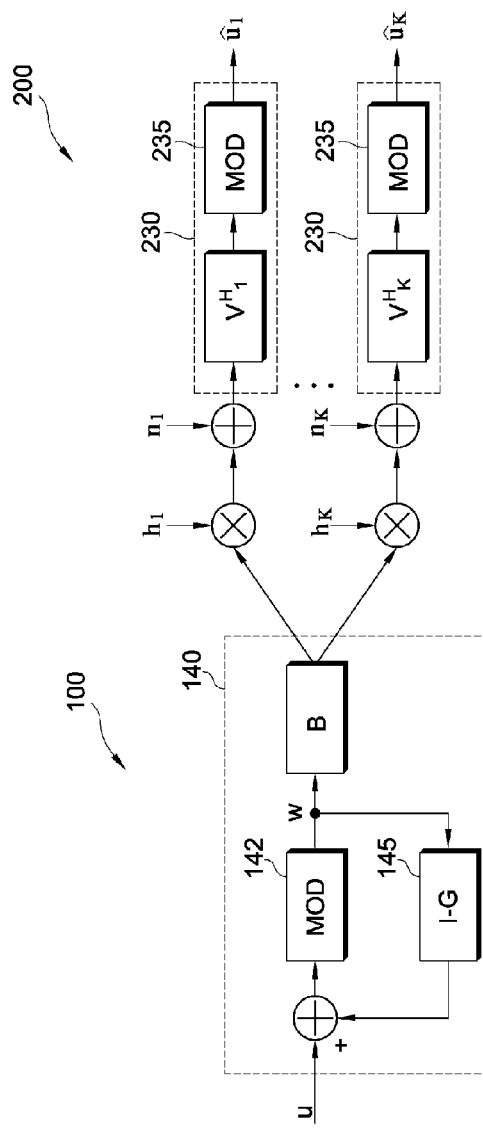
[Fig. 4]
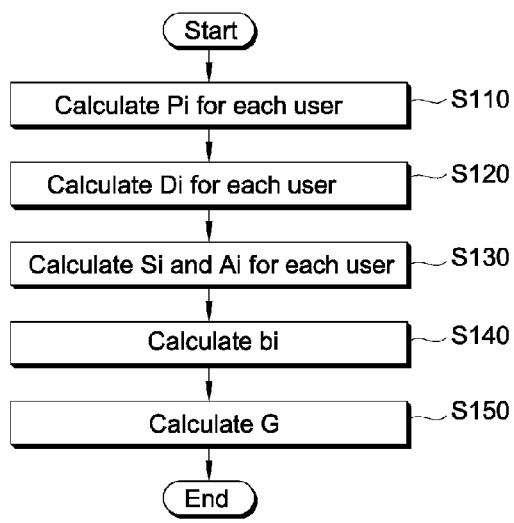

[Fig. 5]
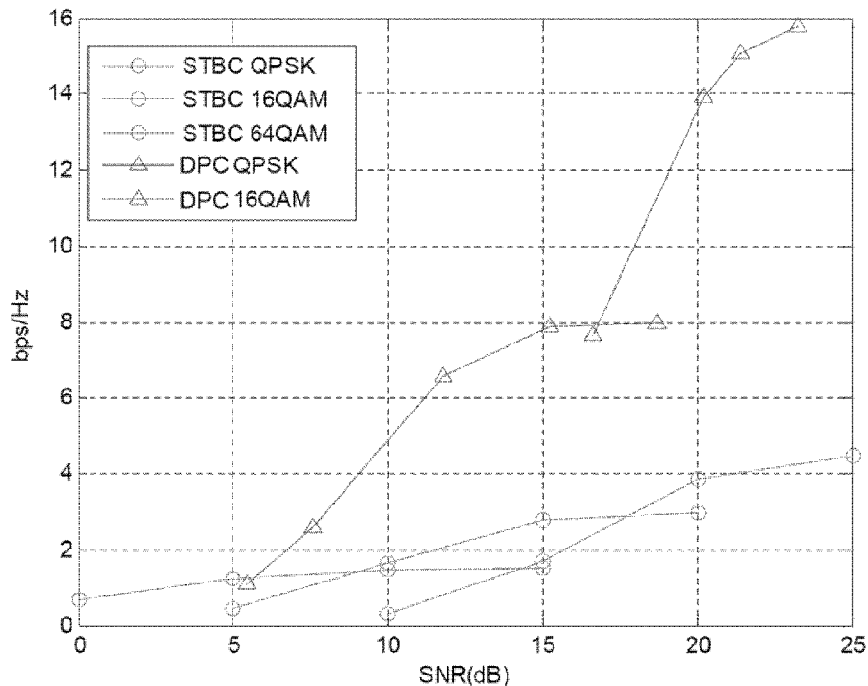
[Fig. 6]
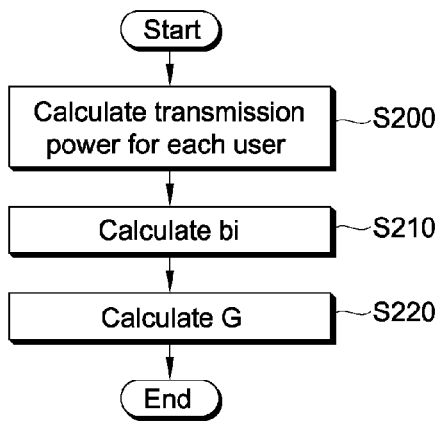
[Fig. 7]
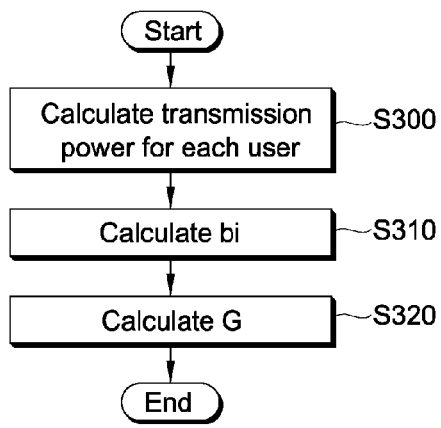

[Fig. 8]
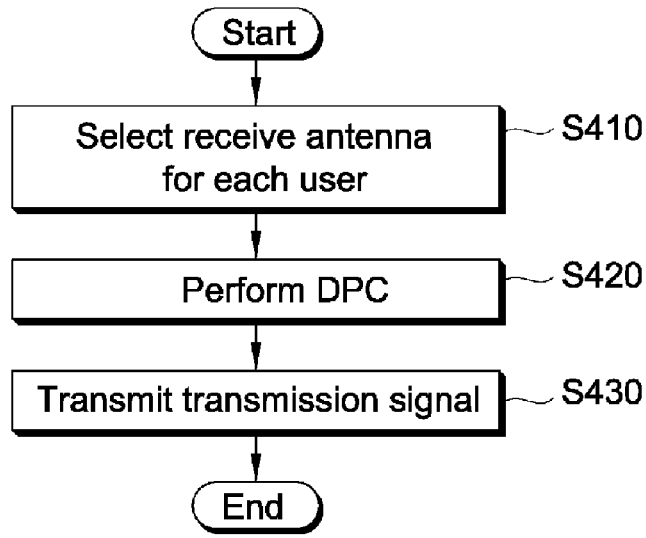
[Fig. 9]
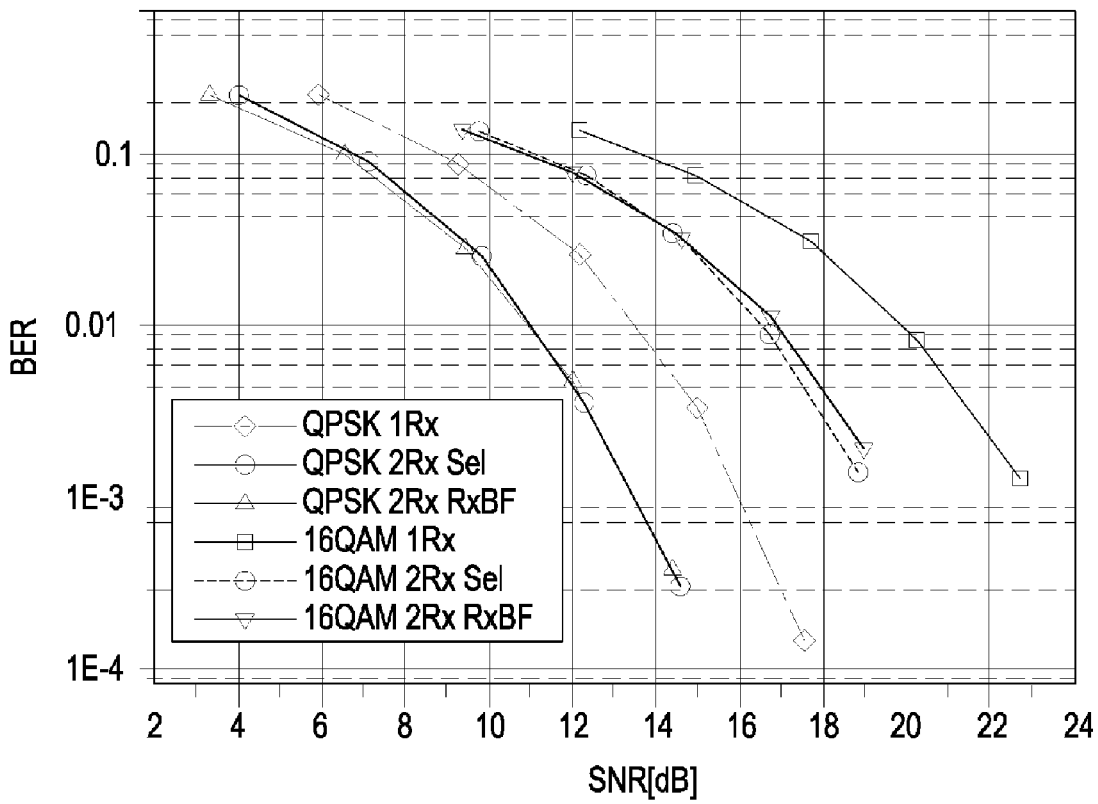

[Fig. 10]
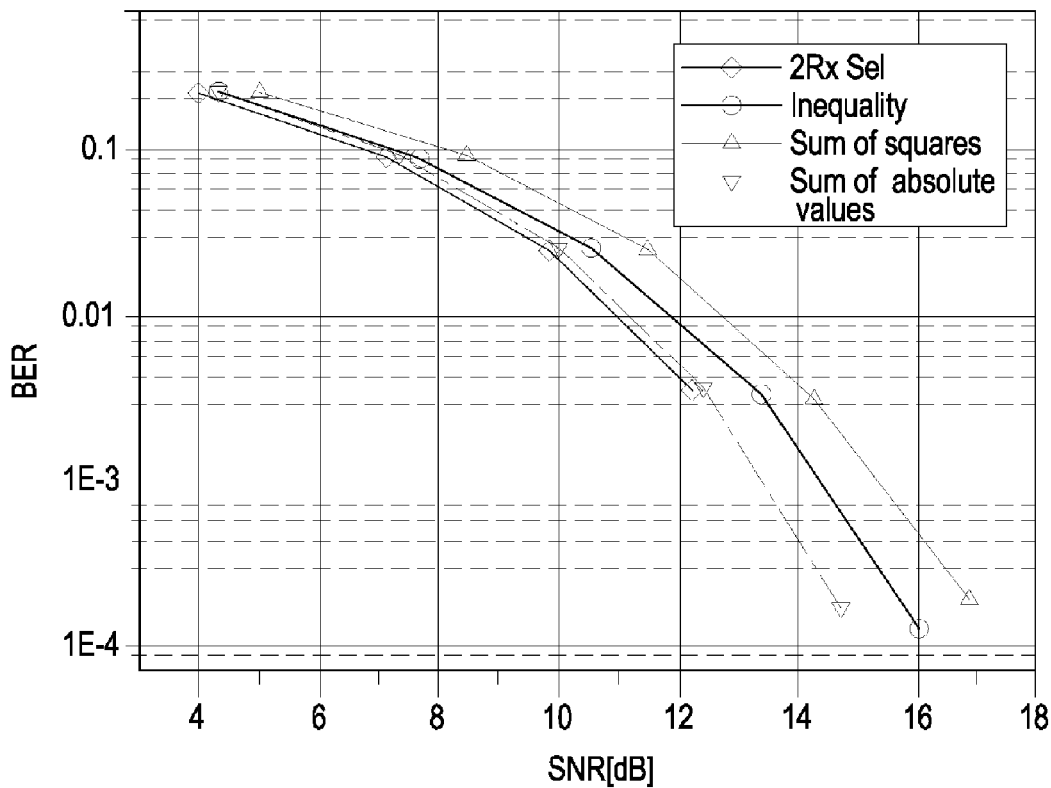
[Fig. 11]
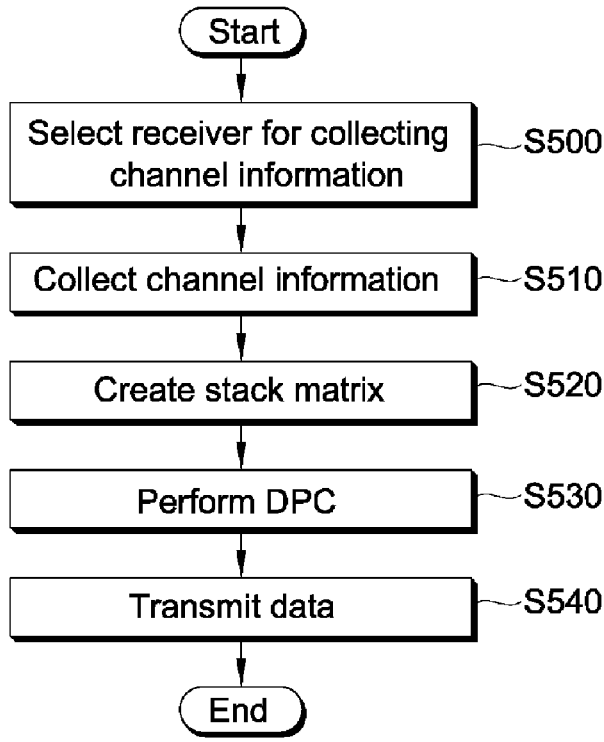

[Fig. 12]
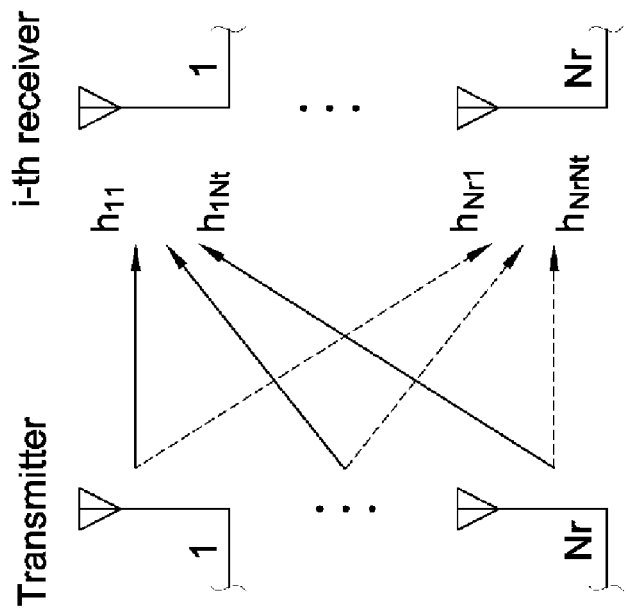
[Fig. 13]
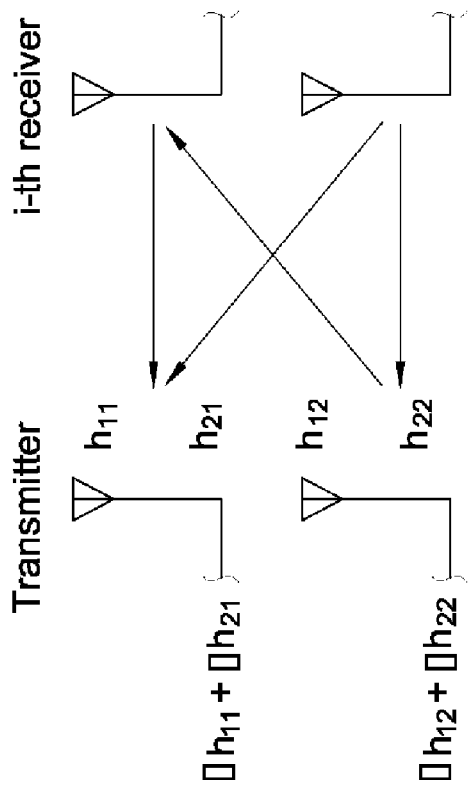

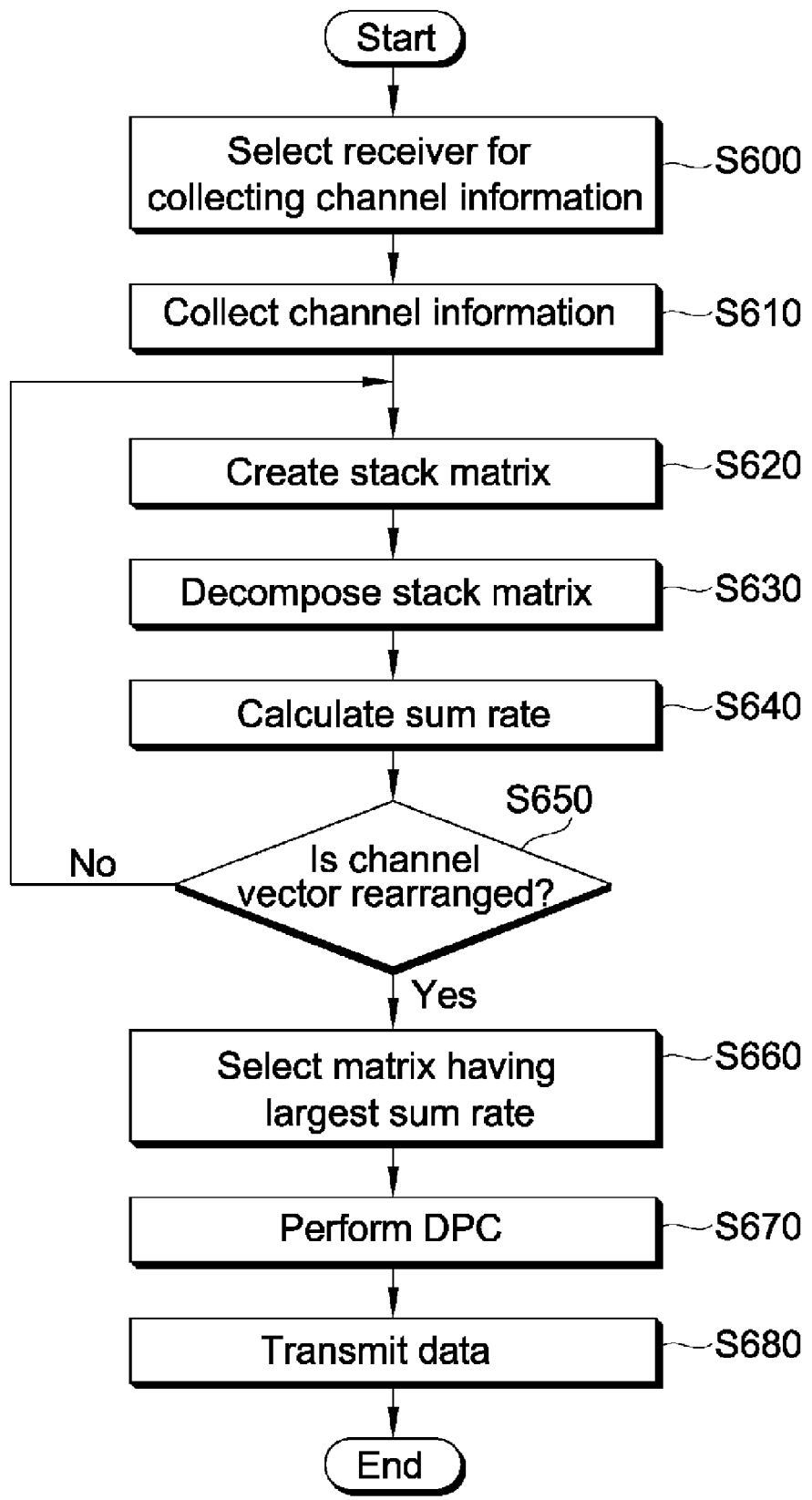
[Fig. 14]

[Fig. 15]
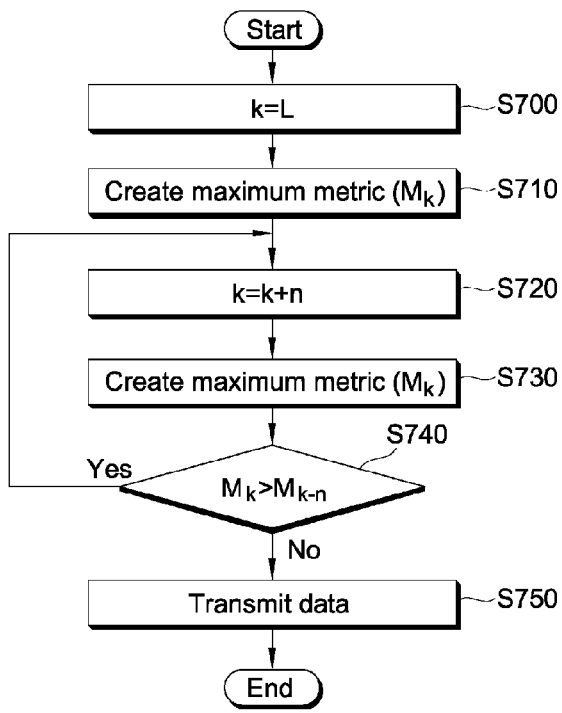
[Fig. 16]
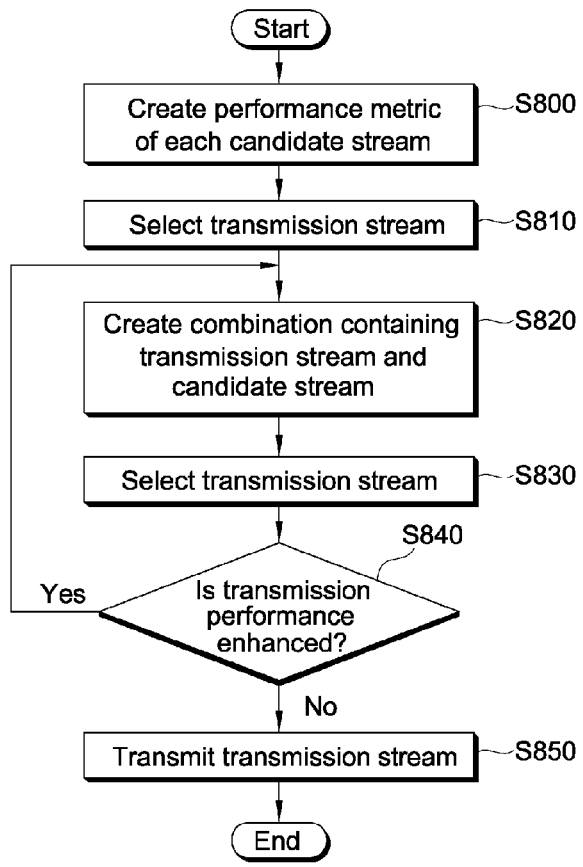

[Fig. 17]

| k=1 | Combination | (1) | (2) | (3) | (4) | (5) |
| --- | --- | --- | --- | --- | --- | --- |
| | Transmission rate | 0.2 | 0.2 | 0.4 | 1.0 | 1.2 |

| k=2 | Combination | (5,1) | (5,2) | (5,3) | (5,4) |
| --- | --- | --- | --- | --- | --- |
| | Transmission rate | 1.0  0.3 | 0.5  0.9 | 0.9  0.8 | 0.5  0.4 |

| k=3 | Combination | (5,3,1) | (5,3,2) | (5,3,4) |
| --- | --- | --- | --- | --- |
| | Transmission rate | 0.3  0.5  0.5 | 0.7  0.5  0.4 | 0.3  0.4  0.8 |

[Fig. 18]

| k=1 | Combination | (1) | (2) | (3) | (4) | (5) |
|---|---|---|---|---|---|---|
| | Transmission rate | 1.0 | 1.2 | 0.5 | 0.4 | 0.2 |

| k=2 | Combination | (2,1) | (2,2) | (2,3) | (2,4) | (2,5) |
|---|---|---|---|---|---|---|
| | Transmission rate | 0.7 0.6 | 0.5 0.6 | 0.4 0.5 | 0.7 1.0 | 0.3 0.4 |

| k=3 | Combination | (2,4,1) | (2,4,2) | (2,4,3) | (2,4,4) | (2,4,5) |
|---|---|---|---|---|---|---|
| | Transmission rate | 0.4 0.3 0.4 | 0.4 0.5 0.7 | 0.2 0.5 0.5 | 0.6 0.4 0.3 | 0.7 0.3 0.4 |

[Fig. 19]
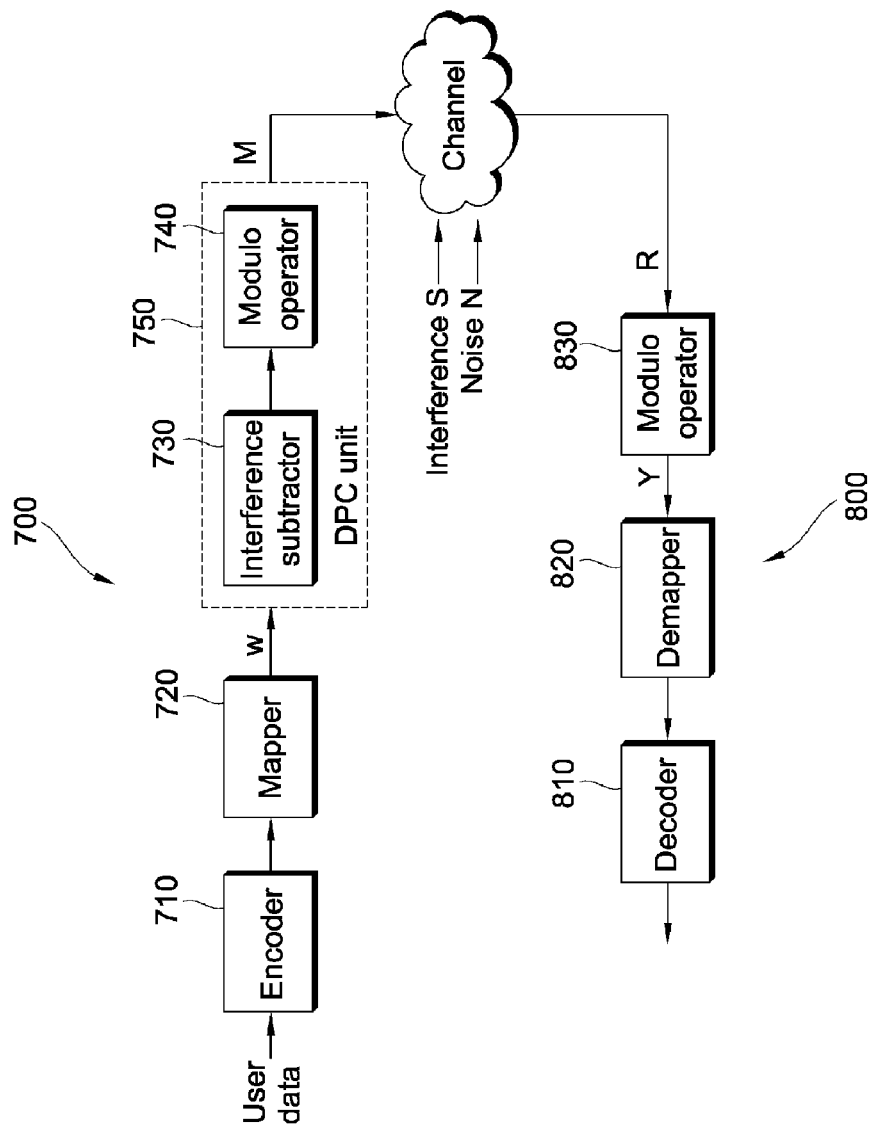
[Fig. 20]
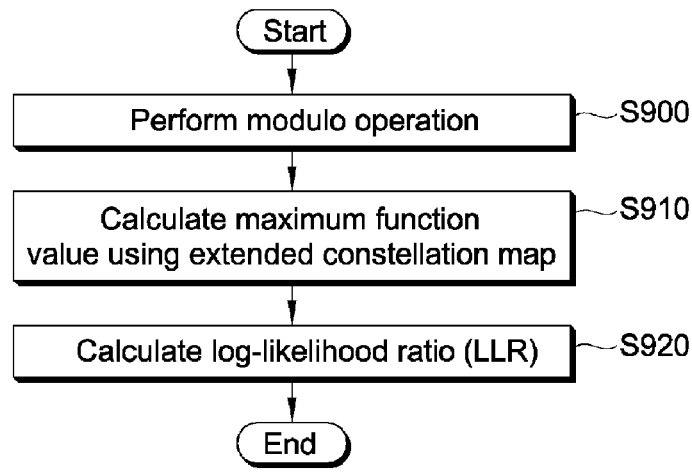

[Fig. 21]
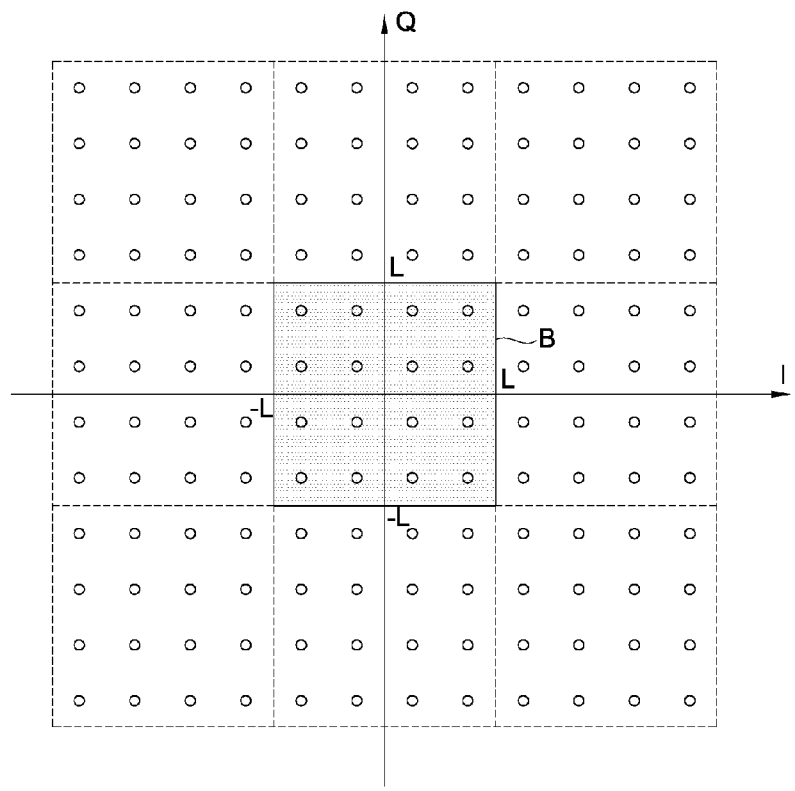
[Fig. 22]
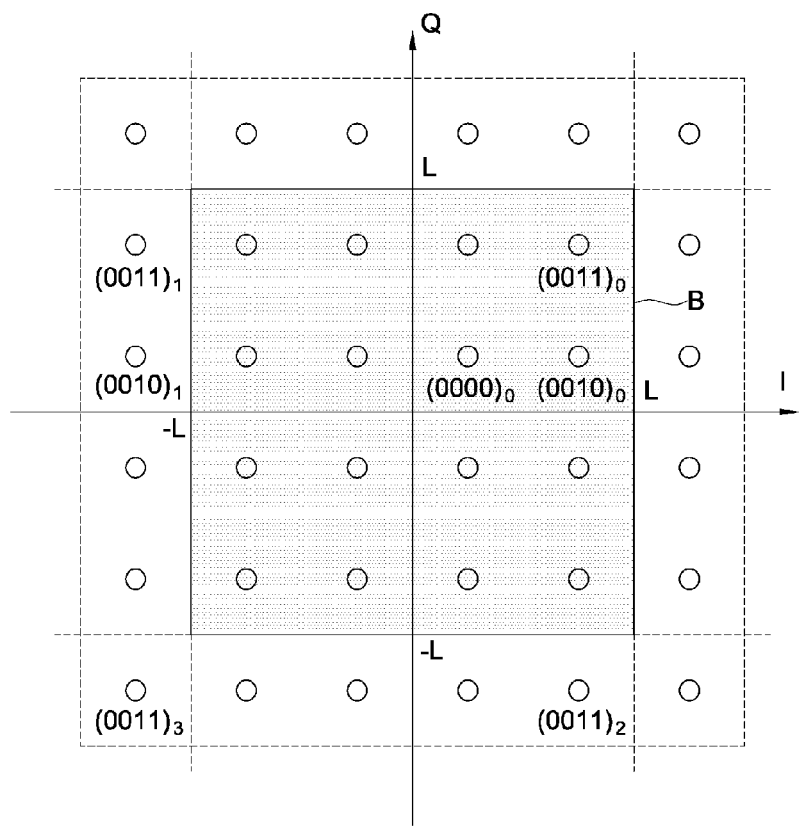

[Fig. 23]
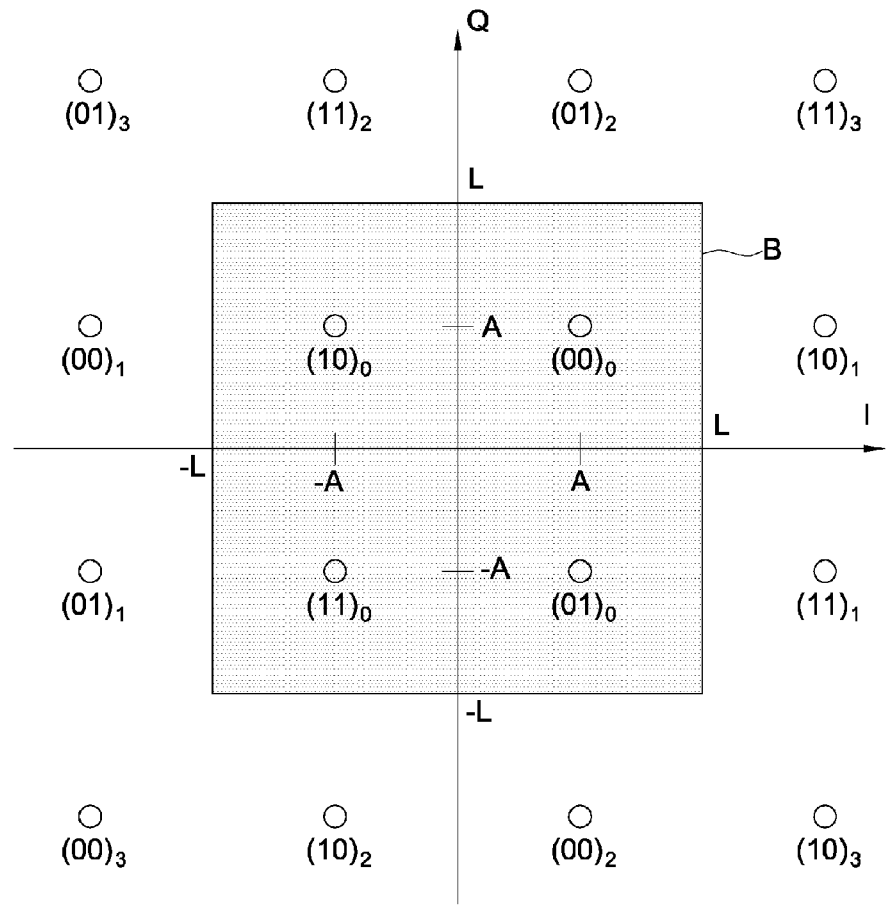
[Fig. 24]
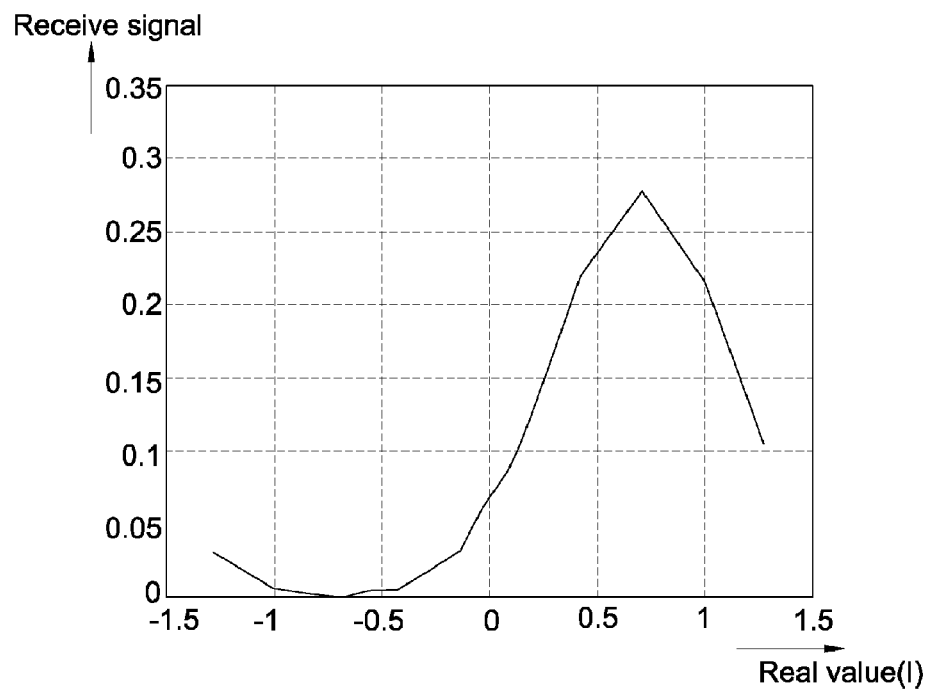

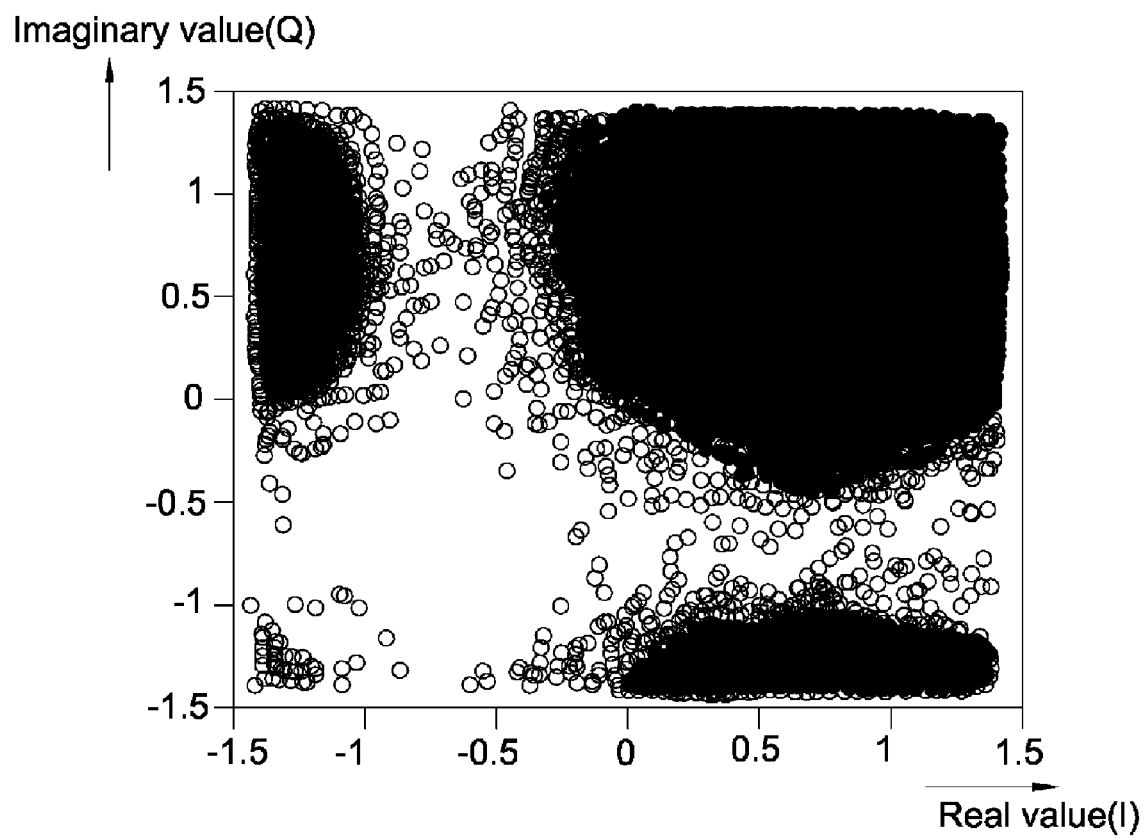
[Fig. 25]

DATA TRANSMISSION METHOD USING DIRTY PAPER CODING IN MIMO SYSTEM

This application claims the benefit of PCT/KR2007/005723 filed on Nov. 15, 2007, and Korean Patent Application Nos. 10-2006-0112588 filed on Nov. 15, 2006, 10-2007-0026945 filed on Mar. 20, 2007, 10-2007-0027462 filed on Mar. 21, 2007, and 10-2007-0028699 filed on Mar. 23, 2007, the contents of which are hereby incorporated herein by reference for all purposes in their entirety.

TECHNICAL FIELD

The present invention relates to radio communication, and more specifically, to a data transmission method using dirty paper coding (DPC) in a multiple-antenna system.

BACKGROUND ART

Owing to generalization of information communication services, advent of a variety of multimedia services, appearance of high quality services, and the like, the demand for communication services are rapidly increased. A research is in progress on a variety of wireless communication techniques in various fields to satisfy such demand.

Multiple input multiple output (MIMO) technique is spotlighted as the technique of high frequency efficiency for enhancing reliability of links and preventing interference between the links. The MIMO technique allows the signals that are independently transmitted through multiple transmit antennas to obtain diversity gain.

A MIMO system using multiple antennas can enhance a transmission rate and reduce probability of packet error by allocating an orthogonal resource to a user to avoid interference among users. The MIMO system can enhance the transmission rate by assigning a single orthogonal resource to a plurality of users. A transmission method of the MIMO system includes a spatial multiplexing method for transmitting user data on each antenna and a method of transmitting data of each user data on each virtual spatial layer through pre-coding.

The MIMO system can be divided into a point-to-point communication system, such as a single user MIMO, and a point-to-multipoint communication system, such as a multiple user MIMO. In the point-to-multipoint communication system, such as a multiple user MIMO, an interference pre-subtraction method performed by a transmitter is recently spotlighted. If it is assumed that a signal u1 is transmitted for a first user and a signal u2 is transmitted for a second user, a transmitter pre-subtracts the signal u1 from the signal u2. At this point, a receiver of the second user can receive only the signal u2 as if there is no interference. According to this technique, the receiver does not need to separately remove interference, and thus complexity of the receiver can be greatly reduced. One of such methods is called as dirty paper coding (DPC). "M. Costa, Writing on Dirty Paper, IEEE Trans. on Inf. Theory, vol. IT-239, No. 3, May 1983" can be referenced for the DPC. In the reference, Costa demonstrates through the DPC that channel capacity under a transmit power constraint is the same as channel capacity when interference does not exist.

However, a method or apparatus for efficiently implementing the DPC in point-to-multipoint communication has not been disclosed. Furthermore, although the MIMO technique can implemented a high transmission rate, examples of utilizing DPC are difficult to find. Accordingly, a technique for enhancing performance of a system by combining MIMO and DPC is required.

Furthermore, a transmission rate is not easy to control when transmitting data if there is a plurality of data streams, due to complexity of a MIMO encoding scheme and the like. In addition, data streams needs to be transmitted only to certain users among a plurality of users. Accordingly, a plurality of data streams needs to be efficiently distributed and transmitted within limited radio resources.

DISCLOSURE OF INVENTION

Technical Problem

The present invention provides a data transmission method using dirty paper coding (DPC) in a multiple input multiple output (MIMO) system.

The present invention also provides a data transmission method for efficiently scheduling a plurality of streams and transmitting the plurality of streams to multiple users using multiple antennas.

The present invention also provides a method of reducing errors due to a modulo operation.

Technical Solution

In an aspect, a data transmission method for multiple users having multiple receive antennas is provided. The method includes selecting a receive antenna among the multiple receive antennas for each user, performing DPC (Dirty Paper Coding) from the multiple transmit antennas to the receive antenna and transmitting a transmission signal on which the DPC is performed.

In another aspect, a data transmission includes calculating a transmission rate at which data is transmitted to each receiver using channel information fed back from a plurality of receivers, performing DPC on a transmission symbol to be transmitted to each receiver based on the calculated transmission rate and transmitting a transmission signal on which the DPC is performed.

In still another aspect, a data transmission method for selecting at least one transmission stream from N candidate streams (N is an integer of one or more) and transmitting the selected transmission stream is provided. The method includes calculating a performance metric for each of the candidate streams, selecting a candidate stream having a maximum performance metric among the performance indexes as a first transmission stream, selecting a candidate stream having a largest sum of performance metrics of respective streams as a second transmission stream, from a combination containing the first transmission stream and at least one or more candidate streams among the other candidate streams and transmitting the first transmission stream and the second transmission stream.

In still another aspect, a data transmission method for multiple users having multiple receive antennas is provided. The method includes obtaining a user combination where a sum of performance metrics of respective streams becomes largest, for a plurality of streams to be transmitted to multiple users, performing pre-coding on a stream to be transmitted to each user belonging to the user combination and transmitting a signal on which the pre-coding is performed.

In still another aspect, a demapping method includes creating a maximum function value having the highest probability for a receive signal obtained by performing a modulo operation on an input signal to correspond to a candidate constellation point on an extended constellation map and creating a log-likelihood ratio (LLR) using the maximum function value.

ADVANTAGEOUS EFFECTS

Since DPC is implemented through a receive antenna selected among multiple receive antennas, complexity is not much increased although the DPC is applied to a MIMO system. Furthermore, transmission power and a transmission rate of a user can be adaptively and efficiently set depending on a channel state.

Since a stream to be transmitted is efficiently scheduled in a user combination and the scheduled stream is transmitted through pre-coding or DPC, performance of data transmission can be enhanced. Furthermore, since the number of variable streams and a combination of users to transmit the streams are diversely modified, high transmission performance can be implemented.

Losses are reduced owing to a modulo operation that is accompanied by implementing DPC, and therefore, reception errors can be reduced as a result.

BRIEF DESCRIPTION OF THE DRAWINGS

FIG. 1 is a block diagram showing a transmitter having multiple antennas.

FIG. 2 is a block diagram showing a receiver having multiple antennas.

FIG. 3 is an exemplary view modeling a transmitter having multiple transmit antennas and a receiver having a receive antenna.

FIG. 4 is a flowchart illustrating a method of implementing DPC.

FIG. 5 is a graph showing transmission rates of DPC by the size of constellation.

FIG. 6 is a flowchart illustrating a method of implementing DPC at a fixed transmission rate.

FIG. 7 is a flowchart illustrating a method of implementing DPC under a fixed power.

FIG. 8 is a flowchart illustrating a data transmission method for multiple receive antennas.

FIG. 9 is a graph showing an example simulating DPC for multiple receive antennas.

FIG. 10 is a graph showing another example simulating DPC for multiple receive antennas.

FIG. 11 is a flowchart illustrating a data transmission method using DPC according to an embodiment of the present invention.

FIG. 12 is a view showing an example of collecting channel information for the i-th receiver.

FIG. 13 is an exemplary view showing another example of collecting channel information for the i-th receiver.

FIG. 14 is a flowchart illustrating the steps of transmitting data using DPC according to an embodiment of the present invention.

FIG. 15 is a flowchart illustrating a data transmission method according to an embodiment of the present invention.

FIG. 16 is a flowchart illustrating a data transmission method according to an embodiment of the present invention.

FIG. 17 is a view showing an example of creating a transmission combination.

FIG. 18 is an exemplary view showing another example of creating a transmission combination.

FIG. 19 is a block diagram showing a transmitter and a receiver according to an embodiment of the present invention.

FIG. 20 is a view showing a demapping method according to an embodiment of the present invention.

FIG. 21 is a view showing an example of an extended constellation.

FIG. 22 is a view showing an example of arranging candidate constellation points on the extended constellation map of FIG. 21.

FIG. 23 is an exemplary view showing an extended constellation map in QPSK.

FIG. 24 is a graph showing a receive signal after performing a modulo operation on a symbol mapped in QPSK when noises form a Gaussian distribution.

FIG. 25 is a view showing coordinates on a constellation map for signals that receive symbols mapped in QPSK.

MODE FOR THE INVENTION

Techniques described below can be used for a variety of communication systems. A communication system is widely deployed to provide a variety of communication services such as voices, packet data, and the like. This technique can be used for downlink or uplink. Downlink means a communication from a base station (BS) to a user equipment (UE), and uplink means a communication from the user equipment and the base station. The base station generally is a fixed station that communicates with the user equipment and can be referred to as another terminology, such as a node-B, base transceiver system (BTS), access point, or the like. The user equipment can be fixed or mobile and can be referred to as another terminology, such as a mobile station (MS), user terminal (UT), subscriber station (SS), wireless device, or the like.

FIG. 1 is a block diagram showing a transmitter having multiple antennas.

Referring to FIG. 1, a transmitter 100 includes a scheduler 110, channel encoders 120-1 to 120-K, mappers 130-1 to 130-K, preprocessors 140-1 to 140-K, a multiplexer 150, and a controller 180. The transmitter 100 also comprises Nt (Nt>1) transmit antennas 190-1 to 190-Nt. The transmitter 100 can be a part of the base station in the downlink, and the transmitter 100 can be a part of the user equipment in the uplink.

The scheduler 110 receives data from N users and outputs K streams to be transmitted at a time. Each of the channel encoders 120-1 to 120-K encodes an input stream in a predetermined coding scheme and forms coded data. Each of the mappers 130-1 to 130-K maps the coded data to a symbol representing a location on a signal constellation. Any kind of modulation scheme can be used, including m-Phase Shift Keying (m-PSK) and m-Quadrature Amplitude Modulation (m-QAM).

The preprocessors 140-1 to 140-K performs DPC on an inputted data symbol u and creates an input symbol x. The multiplexer 150 assigns an appropriate sub-carrier to the input symbol x and multiplexes the symbol for a user. The multiplexed symbols are transmitted through transmit antennas 190-1 to 190-Nt.

The controller 180 determines users and transmission rates with available resources using channel information of each user and transmits the determined users and transmission rates to the scheduler 100, encoders 120-1 to 120-K, and mappers 130-1 to 130-K. The scheduler 100 extracts channel information from feedback data and selects a modulation and coding scheme (MCS). Data can be transmitted at a different transmission rate for each user depending on channel information of the user. In addition, the controller 180 selects an antenna for each user and controls the pre-processors 140-1 to 140-K to perform preprocessing accordingly.

The channel information may include channel state information (CSI), channel quality information (CQI), or user priority information. A channel matrix, a channel correlation matrix, a quantized channel matrix, a quantized channel correlation matrix, or the like between transmitters and receivers can be the channel state information. A signal-to-noise ratio (SNR), a signal-to-interference and noise ratio (SINR) or the like between the transmitters and the receivers can be the channel quality information. The user priority information is information on a priority of a user that depends on a user level or the like.

FIG. 2 is a block diagram showing a receiver having multiple antennas.

Referring to FIG. 2, a receiver 200 comprises a demodulator 210, a channel estimator 210, a post-processor 230, a demapper 240, a channel decoder 245, and a controller 260. The receiver 200 can be a part of the user equipment in the downlink, and the receiver 200 can be a part of the base station in the uplink.

A signal received from a receiving antenna 290 is demodulated by the demodulator 210. The channel estimator 220 estimates a channel, and the post-processor 230 performs a post-process corresponding to the preprocessors 140-1 to 140-K. The demapper 240 demaps an input symbol into coded data, and the channel decoder 250 decodes the coded data and restores original data. The controller 260 feeds back feedback information containing channel state information, channel quality information, and user priority information to the transmitter 100.

I. Modeling for Implementing DPC

FIG. 3 is an exemplary view modeling a transmitter having multiple transmit antennas and a receiver having a receive antenna.

Referring to FIG. 3, a preprocessor 140 performs DPC on an inputted symbol u and creates an input symbol x. The preprocessor 140 includes a modulo operation unit 142 and a feedback unit 145. The modulo operation unit 142 performs a modulo operation, and the feedback unit 145 feeds back an output of the modulo operation unit 142 to the input side of the modulo operation unit 142 again to remove interference among multiple users. The input symbol x is created by multiplying a transmit antenna matrix B to a vector w through a modulo operation and transmits the created input symbol x through a transmit antenna.

The post-processor 230 of the receiver 200 processes a receive antenna matrix $v_i^H$ for a receive signal inputted from the receive antenna 290 and transmits the receive antenna matrix to the modulo operation unit 235. Hereinafter, an upper index H means a Hermitian matrix. An output of the modulo operation unit 250 becomes an estimation symbol, and the estimation symbol is demapped and channel-decoded to restore original data.

An inputted data symbol vector $u=\{u_1, \ldots, u_K\}$ contains data symbols of user 1 to user K. Data symbol $u_i$ of user i has a constellation size determined by transmission rate $Rate_i$ of user i. $(-L_i, L_i)$ is determined as an interval at which the constellation is contained. For example, if the constellation size is 16-QAM at the transmission rate of 4 bits per channel, coordinates of constellation points are selected from $\{\pm1, \pm3\}$, and it becomes that $L_i=4$.

A matrix I-G fed back by the feedback unit 145 is an upper triangular matrix. The matrix I-G previously subtracts multiple user interference in order of encoding. Hereinafter, encoding is performed in order from user K to user 1.

Using modulo operation, the previously subtracted values create a vector w which can be obtained as shown $$w_i = u_i^- \sum_{j=i+1}^{K} g_{ij} w_j \bmod(-L_i, L_i]$$

Math Figure 1 where $w_i$ denotes the i-th element of the vector w, and $g_{ij}$ denotes the (i,j)-th element of matrix G.

The modulo operation is performed to reduce transmission power while maintaining distinguishability of the constellation points. That is, output w of the preprocessor 140 is constrained within finite interval $(-L_i, L_i]$ through the modulo operation. If power of a feedback signal is higher than power of a data symbol, vector w has a uniform distribution within the finite interval $(-L_i, L_i]$. If $\sigma_{wi}^2$ is power of $w_i$, it becomes that $\sigma_{wi}^2 = 2L_i^2/3$ in the uniform distribution. $w_i$ and $w_j$ are uncorrelated for $i \neq j$ due to the modulo operation. Accordingly, it is that $R_w = E[ww^H] = \text{diag}(\sigma_{w1}^2, \ldots, \sigma_{wK}^2)$.

Hereinafter, how to obtain a feedback matrix G is described. The feedback matrix G is designed to remove interference from a user who is encoded first.

It can be said that the operation of the preprocessor of the transmitter is practically equal to that of the decision feedback equalizer (DFE), which can be implemented in the receiver. Accordingly, matrix G can be obtained by the DFE of the receiver.

Receive signal $y_i$ of user i is as shown $$y_i = h_i x + n_i = h_i b_i w_i + h_i \sum_{i \neq j} b_j w_j + n_i$$

Math Figure 2 where $h_i$ denotes a Nt×1 channel vector from the transmitter to the i-th receiver, $n_i$ denotes a noise for the i-th receiver, and $b_i$ denotes a vector multiplied by i-th user data in the transmit antenna matrix B described below.

A linear DFE includes a zero-focusing (ZF) DFE and a minimum mean square error (MMSE) DFE.

First, a filter matrix G for the ZF DFE is obtained. The filter matrix G can remove interference of a user who is encoded first. A transmission signal estimated for the i-th user can be expressed as shown $$\hat{x}_i = \frac{y_i}{h_i b_i} = \left( w_i + \frac{h_i \sum_{i \neq j} b_j w_j}{h_i b_i} + \frac{n_i}{h_i b_i} \right)_{\bmod i}$$

Math Figure 3 where 'mod' denotes a modulo operation.

If noises are ignored, an output of the ZF DFE for the (K−1)-th user is expressed as shown $$\hat{u}_{K-1} = \left( w_{K-1} + \frac{h_{K-1} b_K w_K}{h_{K-1} b_{K-1}} + \frac{h_{K-1} \sum_{j \neq K, K-1} b_j w_j}{h_{K-1} b_{K-1}} \right)_{\bmod K-1}$$

$$= \left( u_{K-1} - g_{K-1K} u_K + \frac{h_{K-1} b_K u_K}{h_{K-1} b_{K-1}} + \right.$$

$$\left. \alpha_1 L_i + j\alpha_2 L_i + \frac{h_{K-1} \sum_{j \neq K, K-1} b_j w_j}{h_{K-1} b_{K-1}} \right)_{\bmod K-1}$$

Math Figure 4 where $\alpha_1$ and $\alpha_2$ denote arbitrary constants.

If the (K−1)-th user desires to remove interference of the K-th user, i.e., the next user, it should be $$g_{K-1\,K} = \frac{h_{K-1}b_K}{h_{K-1}b_{K-1}}.$$

If the expression is expanded in this manner, the (i,j)-th element $g_{ij}$ of matrix G can be expressed as shown $$g_{ij} = \frac{h_i b_j}{h_i b_i} \qquad \text{Math Figure 5}$$

In MMSE DFE, partial interference pre-subtraction is performed. In this case, the (i,j)-th element $g_{ij}$ of matrix G can be expressed as shown $$g_{ij} = \beta_i \frac{h_i b_j}{h_i b_i} \qquad \text{Math Figure 6}$$

where $\beta_i$ can be calculated as follows.

$$\beta_i \frac{\sigma_{wi}^2 |h_i b_i|^2}{1 + \sum_{j=1}^{i} \sigma_{wj}^2 |h_i b_j|^2} \qquad \text{Math Figure 7}$$

II. DPC Implementation—Singular Value Decomposition (SVD) Method

DPC can be performed by applying SVD. SVD can decompose arbitrary matrix H into unitary matrixes U and V and a diagonal matrix $\Lambda$ as shown below.

Math Figure 8

$$H = U\Lambda V^H$$

If it is assume that H is channel information known to both a transmitter and a receiver, the transmitter processes a weight matrix for a transmission signal, and the receiver can increase channel capacity by appropriate signal processing.

A transmission signal is x=Bw, and a covariance matrix $E[xx^H]=BR_w B^H$ can be created using x. Here, $R_w = E[ww^H]=\text{diag}(\sigma_{w1}^2, \ldots, \sigma_{wK}^2)$, which becomes a diagonal matrix. If Equation 8 is corresponded to the covariance matrix $E[xx^H]$, the unitary matrixes U and V correspond to the transmit antenna matrix B, and the diagonal matrix $\Lambda$ corresponds to $R_w$.

A transmit covariance matrix for user i is $\sigma_{wi}^2 b_i b_i^H$. If $S_i$ is a transmit covariance matrix for user i, $S_i$ can be defined as $S_i = \lambda_i m_i m_i^H$. Here, $\lambda_i$ is an eigenvalue of $S_i$, and $m_i$ is a unit-norm eigenvector. $\lambda_i$ is optimal power allocation for user i, and $m_i$ is a transmit beam-forming vector. Accordingly, vector bi that is a product of the transmit antenna matrix B by data of the i-th user can be obtained as shown below.

$$b_i = \frac{\sqrt{\lambda_i}}{\sigma_{wi}} m_i \qquad \text{Math Figure 9}$$

Hereinafter, a conversion for outputting a covariance matrix from transmitters to receivers, having the same transmission rate, will be described for a covariance matrix from the receivers to the transmitters. The conversion is based on duality between a DPC region of a point-to-multipoint downlink channel and a capacity region of a multipoint-to-point uplink channel. That is, a sum of transmission rates allowed in uplink under the constraint of power is the same as a sum of transmission rates allowed in downlink under the constraint of power. This can be easily proved for multiple transmit antennas and multiple receive antennas, and S. Vishwanath et al, "Duality, Achievable Rates and Sum-Rate Capacity of Gaussian MIMO Broadcast Channels", IEEE Trans. on Inf. Theory, Vol. 49, No. 10, October 2003 can be referenced.

It is assumed that the receiver has a decoding order of decoding user 1 first and sequentially decoding next users. Matrixes $A_i$ and $D_i$ for the i-th user are respectively defined as shown $$A_i \equiv I + h_i \left( \sum_{j=1}^{i-1} S_j \right) h_i^H \qquad \text{Math Figure 10}$$

$$D_i \equiv I + \sum_{j=i+1}^{K} h_j^H P_j h_j \qquad \text{Math Figure 11}$$

where $P_i$ is power of the i-th user in the uplink.

A transmission rate $\text{Rate}_i^{UPLINK}$ in the uplink for user i is as shown $$\text{Rate}_i^{UPLINK} = \log \frac{\left| I + \sum_{j=i}^{K} h_j^H P_j h_j \right|}{\left| I + \sum_{j=i+1}^{K} h_j^H P_j h_j \right|} \qquad \text{MathFigure 12}$$

$$= \log \left| I + \left( I + \sum_{j=i+1}^{K} h_j^H P_j h_j \right)^{-1} h_i^H P_i h_i \right|$$

$$= \log |I + D_i^{-1} h_i^H P_i h_i|$$

where $D_i$ denotes interference experienced by user i in the uplink.

Using the characteristics of |I+AD|=|I+DA| and $A_j^{-1/2} A_j^{1/2} = I$, transmission rate can be expressed as shown below Math Figure 13

$$\text{Rate}_i^{UPLINK} = \log |I + D_i^{-1/2} h_i^H A_i^{-1/2} A_i^{1/2} P_i A_i^{1/2} A_i^{-1/2} h_i D_i^{-1/2}|$$

Now, the transmission rate $\text{Rate}_i^{DOWNLINK}$ in the downlink of user i, which has an encoding order inverse to the decoding order, is considered. That is, it is assumed that the transmitter has an encoding order of encoding user K first and sequentially encoding previous users.

$$\text{Rate}_i^{DOWNLINK} = \log \frac{\left| I + \sum_{j=i}^{i} h_j S_j h_j^H \right|}{\left| I + \sum_{j=i}^{i-1} h_j S_j h_j^H \right|} \qquad \text{MathFigure 14}$$

$$= \log |I + A_i^{-1} h_i S_i h_i^H|$$

$$= \log |I + A_i^{-1/2} h_i S_i h_i^H A_i^{-1/2}|$$

Here, $A_i$ denotes interference experienced by user i in the downlink.

If $S_i$ is selected to satisfy the following Equation, it becomes that $\text{Rate}_i^{UPLINK} = \text{Rate}_i^{DOWNLINK}$ $$S_1 = D_1^{-1/2}\overline{P_1}D_1^{-1/2}$$

$$\vdots$$

$$S_i D_i^{-1/2}\overline{A_i^{1/2}P_1 A_i^{1/2}}D_i^{-1/2}$$

$$\vdots$$

$$S_K = \overline{A_K^{1/2}P_K A_K^{1/2}}$$

Math Figure 15

Since $S_i$ is subordinates only to $S_1, \ldots, S_{i-1}$, $S_i$ can be sequentially obtained. Since the encoding is performed for all K users, a covariance matrix of the down link having the same transmission rate as that of the uplink can be calculated. If SVD is performed like $B_i^{-1/2}h_i^H A_i^{-1/2} = F_i \Lambda_i G_i^H$, covariance matrix $S_i$ of the i-th user can be calculated as shown below.

Math Figure 16

$$S_i = D_i^{-1/2} F_i G_i^H A_i^{1/2} P_i A_i^{1/2} G_i F_i D_i^{-1/2}$$

Hereinafter, a method of calculating power for user i in the transmitter will be described. Here, minimum transmission power for a given transmission rate Ri and the maximum bit error rate (BER) is provided to user i.

Considering the encoding order of encoding user K first and user 1 last, a transmission rate Ri that can be accomplished for user i in a multiple user downlink channel is as shown below.

$$Rate_i^{DOWNLINK} = \log\left(\frac{1 + h_i \sum_{j=1}^{i} S_j h_i^H}{\Gamma_{SH}\Gamma_{PM}\left(1 + h_i \sum_{j=1}^{i-1} S_j h_i^H\right)}\right)$$

$$\approx \log\left(\frac{1 + h_i \sum_{j=1}^{i} S_j h_i^H}{1 + h_i \sum_{j=1}^{i-1} S_j h_i^H}\right) - \log(\Gamma_{SH}\Gamma_{PM})$$

Math Figure 17

Accordingly, the problem of minimizing downlink power becomes a problem of calculating minimum power P under the constraint of a transmission rate satisfying Equation 17. Here, the minimum power is $P = \Sigma tr(S_i)$ and $tr(S_i)$ is a sum of diagonal elements of matrix $S_i$.

$\Gamma_{SH}$ and $\Gamma_{PM}$ are SNR gaps generated by real modulation and DPC. $\Gamma_{SH}$ is a shaping loss, i.e., a loss generated by a modulo operation, which is caused by uniformly distributed w. This may bring a loss of about 1.53 dB in a high SNR. $\Gamma_{PM}$ is also a loss generated by a modulo operation, which includes a power loss and a modulo loss. The power loss is generated since power of w is increased higher than that of u, which generates a loss of about m/(m−1) in m-QAM, and thus the loss is increased as the size of constellation is decreased. The loss is generated as much as 1.2494 dB in QAM, 0.2803 dB in 16-QAM, and 0.0684 dB in 64-QAM. The modulo loss is generated by a modulo operation as the nearest neighboring symbols are increased. For example, the power of m-QAM is $$Pe_{AWGN} \approx 4\left(1 - \frac{1}{\sqrt{(m)}}\right)Q\left(\frac{d}{2\sigma}\right),$$

which becomes $$Pe_{MOD} \approx 4Q\left(\frac{d}{2\sigma}\right)$$

by a modulo operation. According, since it becomes such that $$Pe_{MOD} \approx \frac{\sqrt{m}}{\sqrt{m}-1}Pe_{AWGN},$$

this should be considered when $\Gamma_{PM}$ is searched. For example, in order to satisfy Pe=$10^{-6}$, a gap of $5\times10^{-7}$ should be used in QAM, a gap of $7.5\times10^{-7}$ in 16-QAM, and a gap of $8.75\times10^{-7}$ in 64-QAM.

The function shown in Equation 17 is neither convex nor concave to the covariance matrix $S_i$. Therefore, a DPC region satisfying the power constraint is very difficult to find.

A virtual rate is defined as shown below.

Math Figure 18

$$Rv_i^{DOWNLINK} = Rate_i^{DOWNLINK} + \log(\Gamma_{SH}\Gamma_{PM})$$

If a virtual transmission is used, an SINR required for a desired transmission rate and BER can be calculated as $2^{Rv_i^{DOWNLINK}} - 1$ As described above, the DPC region of a MIMO downlink channel having a given power constraint is the same as the capacity region of a MIMO uplink channel having a power constraint sum. If user 1 is decoded first and interference is completely removed, a possible transmission rate in a virtual uplink is as shown below.

$$Rate_i^{UPLINK} = \log\left(\frac{\left|I + \sum_{j=1}^{K} h_j P_j h_j^H\right|}{\left|I + \sum_{j=i+1}^{K} h_j P_j h_j^H\right|}\right)$$

Math Figure 19

Since the function shown in Equation 19 is convex to Pj, a general optimization algorithm can be applied.

As a result, if a receiver has one receive antenna (Nr=1), power Pi of user i can be calculated as shown below.

$$P_i = \frac{2^{Rv_i^{DOWNLINK}} - 1}{h_i^H\left(I + \sum_{j=i+1}^{K} P_j h_j h_j^H\right)^{-1} h_i}$$

$$= \frac{2^{Rv_i^{DOWNLINK}} - 1}{\left|h_i\left(I + \sum_{j=i+1}^{K} h_j^H P_j h_j\right)^{-1/2}\right|^2}$$

Math Figure 20

FIG. 4 is a flowchart illustrating a method of implementing DPC.

Referring to FIG. 4, a transmission power Pi satisfying a given transmission rate is calculated for each user S110. The transmission power can be calculated using Equation 20.

A matrix $D_i$ is obtained based on the transmission power Pi S120. The matrix $D_i$ is defined as shown in Equation 11.

$S_i$ and $A_i$ are sequentially obtained from user 1 using matrix $D_i$ S130. $S_i$ and $A_i$ can be obtained using Equations 16 and 10.

$b_i$ is obtained using covariance matrix $S_i$ S140. $b_i$ can be calculated as shown in Equation 9.

A feedback matrix G is calculated using $b_i$ S150. The feedback matrix G can be calculated in the ZF or MMSE method, using Equation 5 in ZF and Equation 6 in MMSE.

Therefore, all parameters are obtained to perform DPC in the preprocessor 140, and a transmitter can process data symbol u to convert the data symbol into a transmission signal x and transmits the transmission signal to each user.

FIG. 5 is a graph showing transmission rates of DPC by the size of constellation. A transmission rate using a space-time block code (STBC) is compared with a transmission rate using DPC in a system of Nt=4 and Nr=1 (4×1 MIMO).

Referring to FIG. 5, it shows that as the SNR is increased, a system using the DPC has a much higher transmission rate compared to a system using the STBC.

III. DPC Implementation—QR Decomposition Method

DPC can be performed by applying QR decomposition. QR decomposition can be used to obtain vector $b_i$, which is a product of a transmit antenna matrix B by data of user i. A transmitter collects channel information from K receivers and creates a stack matrix $H_s$ as shown $$H_s = \begin{bmatrix} \hat{h}_1 \\ \vdots \\ \hat{h}_i \\ \vdots \\ \hat{h}_K \end{bmatrix} \quad \text{Math Figure 21}$$

where $\hat{h}_i$ is a channel vector for the i-th receiver, and stack matrix $H_s$ is created by stacking K channel vectors. The Hermitian matrix of the stack matrix is divided into a unitary matrix Q and an upper triangular matrix R, which can be expressed as shown below.

Math Figure 22

$$H_s^H = QR$$

Accordingly, the stack matrix becomes $H_s = R^H Q^H$. If the transmit antenna matrix B is put into the unitary matrix Q, it becomes as shown below.

Math Figure 23

$$H_s B = R^H$$

Accordingly, after the transmit antenna matrix B is processed to the stack matrix $H_s$, a low triangular matrix $R^H$ can be obtained. Since interference of a user encoded first by the preprocessor is removed, each user is free from interference of other users.

Vector $b_i$, which is a product of the transmit antenna matrix B by data of user i, can be calculated as shown $$b_i = \frac{\sqrt{P_i}}{\sigma_{wi}} q_i \quad \text{Math Figure 24}$$

where each Pi is a transmission power for the receiver of user i, and $q_i$ is the i-th column vector of the unitary matrix Q.

FIG. 6 is a flowchart illustrating a method of implementing DPC at a fixed transmission rate.

Referring to FIG. 6, if data is transmitted at a fixed transmission rate $Rate_i$ for the i-th receiver, a transmission rate of a downlink can be calculated as shown below.

$$Rate_i = \log\left(1 + \frac{|R_{i,i}|^2 P_i}{\Gamma_{mod} \Gamma_{THP}}\right) \quad \text{Math Figure 25}$$

If a transmission rate is determined for each user, a transmission power $P_i$ allocated for each user is calculated as shown below S200.

$$P_i = \frac{(2^{Rate_i} - 1)(\Gamma_{mod} \Gamma_{THP})}{|R_{i,i}|^2} \quad \text{Math Figure 26}$$

After obtaining transmission power $P_i$ for the i-th receiver, $b_i$ is calculated using Equation 24 S210. After calculating $b_i$, matrix G is obtained S220. Matrix G can be obtained in the ZF or MMSE method, using Equation 5 in ZF and Equation 6 in MMSE.

The transmitter processes data symbol u to convert the data symbol into a transmission signal x and transmits the transmission signal to each user.

FIG. 7 is a flowchart illustrating a method of implementing DPC under a fixed power. It is a method of performing DPC when transmission power is fixed for the i-th receiver.

Referring to FIG. 7, a transmission rate for each user is calculated using Equation 25 under a fixed transmission power S300. If a transmission rate is determined, b is calculated using Equation 24 S310. After calculating $b_i$, matrix G is obtained S320. The transmitter processes a symbol u of data using DPC and transmits the symbol to each user.

$\Gamma_{mod}$ and $\Gamma_{THP}$ of Equations 25 and 26 are losses generated by modulation and DPC. $\Gamma_{mod}$ is a loss generated by modulation. Generally, if data is not coded, 8.8 dB of $\Gamma_{mod}=$ is required to satisfy Pe=10$^{-6}$.

$\Gamma_{THP}$ is a loss generated by implementing DPC. If DPC is not ideal, losses such as a shaping loss, power loss, and modulo loss may occur. The shaping loss is a loss generated by a modulo operation, which is generated since $w_i$ is uniformly distributed. A loss of about 1.53 dB can be generated in a high SNR. The power loss is generated since power of w is increased higher than that of u, which brings a loss of about m/(m−1) in m-QAM, and thus the loss is increased as the size of constellation is decreased. The loss is generated as much as 1.2494 dB in QAM, 0.2803 dB in 16-QAM, and 0.0684 dB in 64-QAM. The modulo loss is generated by a modulo operation as the nearest neighboring symbols are increased.

IV. Method of Selecting a Receive Antenna

If a receiver has one receive antenna Nr=1, DPC can be comparatively easily implemented since duality can be found between an uplink channel and a downlink channel. However, if the receiver has multiple receive antennas, it is not so easy as the method described above since a complex optimization problem should be solved. Accordingly, a data transmission method easy to implement for the multiple receive antennas is needed.

FIG. 8 is a flowchart illustrating a data transmission method for multiple receive antennas.

Referring to FIG. 8, a receive antenna is selected from multiple receive antennas contained in the receiver of each user S410. The method of selecting a receive antenna from multiple receive antennas will be described below.

DPC is performed for the selected receive antenna S420. A transmission method for one receive antenna can be used as is. That is, transmission power Pi satisfying a given transmission rate is calculated for each user, and matrix $S_i$ is obtained based on the transmission power Pi. $b_i$ is obtained using matrix $S_i$, and a feedback matrix G is obtained. Through the obtained parameters, a transmission signal x is created from a data symbol u. The transmission signal x is transmitted S430.

Appropriate receive antennas are selected from multiple receive antennas, and the selected receive antennas are treated as one receive antenna, and then DPC is performed on the one antenna. Accordingly, the technique for one antenna described above can be applied as is, and complexity is not increased so much.

Hereinafter, a method of selecting receive antennas from multiple receive antennas is described.

In an embodiment, each of receive antennas of a receiver is assumed as an independent antenna, and the amount of data can be increased as many as the number of the receive antennas. That is, each receive antenna of a multiple receive antennas is regarded as an independent antenna, and it is regarded as if there is a plurality of receivers having a receive antenna. It is assumed that each of the receive antennas receives an independent transmission signal, and a user receives multiple transmission signals through the multiple receive antennas. The user can obtain at least the same performance as using one receive antenna, and overall transmission capacity can be increased when the number of users in a cell is comparatively small.

In another embodiment, an equivalent channel response is obtained using a receive antenna matrix, and data is transmitted as if there is one receive antenna. That is, it is assumed that only one transmission signal is transmitted for each user, and an equivalent response $$\hat{h}_i = v_i^H h_i$$

is obtained by calculating a receive antenna matrix $v_i^H$ of the user. Multiple receive antennas can be treated as if there is one receive antenna through the equivalent channel response. In this manner, DPC is performed as if there is one receive antenna. The method of calculating the receive antenna matrix is as follows.

The covariance matrix $J_N$ of noise and interference of user i can be expressed as shown $$J_N = J_z + \sum_{j=i+1}^{K} h_j^H P_j h_j \quad \text{Math Figure 27}$$

where $J_z$ is an additive Gaussian noise vector having a covariance matrix. IF SVD is performed on $J_z$, it becomes that $J_N = Q\Delta Q^H$, and it is defined such that $$\hat{h}_i = \Delta^{-1/2} Q^H h_i^H.$$

At this point, channel capacity $$C = \log|h_i^H P_i h_i + J_N| - \log|J_N|$$

of each user can be maximized by maximizing $$\log|\hat{h}_i^H \hat{P}_i \hat{h}_i + I|.$$

If it becomes that $$\hat{h}_i = F\Sigma M^H$$

by performing SVD on $$\hat{h}_i$$

and it is defined such that $$\hat{P}_j = M^H P_j M,$$

a relationship shown below is established.

Math Figure 28

$$\log|\hat{h}_i^H \hat{P}_i \hat{h}_i + I| = \log|\Sigma \hat{P}_i \Sigma^H + I|$$

Since one user receives one signal, the condition for maximizing the Equation 28 is as shown $$\hat{P}_i = \begin{bmatrix} 0 & \cdots & & 0 \\ \vdots & P_{max} & & \vdots \\ & & \ddots & \\ 0 & \cdots & & 0 \end{bmatrix} \quad \text{Math Figure 29}$$

where $P_{max}$ is a value dividing maximum transmission power by the number of users K.

Accordingly, if the location where the maximum value exists is m, the (j,k)-th element of
$\hat{P}_i$
is as follows.

$$\hat{P}_i = \begin{cases} P_{max}, & j = k = m \\ 0, & \text{else} \end{cases} \quad \text{Math Figure 30}$$

At this point, $v_i$ becomes the m-th row vector of matrix M.

In another embodiment, although each user has multiple receive antennas, the user select one receive antenna among the multiple receive antennas and transmits data using the selected antenna. At this point, the method of selecting one receive antenna among the multiple receive antennas can be diversely modified.

As an example, each user can calculate Pi of Equation 19 using one antenna and perform DPC in a combination for minimizing total transmission power. For example, if two users respectively have two receive antennas, there may be four combinations. Pi is calculated for each combination, and a combination minimizing total transmission power is selected.

For another example, a channel is observed from a transmit antenna to receive antennas, and a receive antenna whose norm of a channel vector is the largest can be selected. A sum of absolute values of elements can be selected as the norm of a channel vector. In this case, a receive antenna having the largest sum of absolute values of elements can be selected. Alternatively, a sum of squares of elements can be selected as the norm of a channel vector. In this case, a receive antenna having the largest sum of squares of elements can be selected. In this manner, complexity of calculation can be lowered compared with calculating Pi. In addition, since a receiver can calculate a vector norm by itself, the receiver can obtain a channel vector and select a receive antenna through the obtained channel vector. Information on the selected antenna can be fed back to reduce overload incurred by feedback.

For still another example, if a combination of channels toward respective receive antennas of a user is H, a receive antenna can be selected using Hadamard inequality as shown Math Figure 31

$$\text{Min}\{\Sigma \text{diag}(H^H H) - \det(H^H H)\}$$

where diag(•) denotes diagonal elements of a matrix, and det(•) denotes determinants of the matrix. This may lower complexity of calculation compared with calculating $P_i$. Since such a combination of channels should be performed in a transmitter, each receiver should feed back channel information to the transmitter.

FIG. 9 is a graph showing an example simulating DPC for multiple receive antennas. The figure shows a performance graph when there are four multiple antennas in a transmitter and the transmitter desires to simultaneously transmit data to four users.

Referring to FIG. 9, '1Rx' is a case where there is one receive antenna in a receiver, and '2Rx Sel' is a case where there are two receive antennas, in which DPC is performed in a combination that minimizes total transmission power by calculating Pi of Equation 19. '2Rx RxBf' is a case where DPC is performed when there is one receive antenna after obtaining an equivalent channel response by calculating a receive antenna matrix. If each of the receive antennas of a user is assumed as an independent receiver, and the amount of data to be transmitted is increased as much as the number of receive antennas, the '2Rx Sel' and '2Rx RxBf' show performance almost the same as that of '1Rx'. Although the amount of operation is increased, the '2Rx Sel' and '2Rx RxBf' show further better results in the aspect of performance.

FIG. 10 is a graph showing another example simulating DPC for multiple receive antennas. The shows a performance graph when there are four multiple antennas in a transmitter and the transmitter desires to simultaneously transmit data to four users. Although each of the users has multiple receive antennas, only one antenna among the multiple antennas is selected, and data is transmitted to the antenna.

Referring to FIG. 10, '2Rx Sel' is a case where a receive antenna is selected in a combination that minimizes total transmission power by calculating $P_i$ of Equation 19, and 'sum of absolute values' is a case where a receive antenna is selected using a sum of absolute values as a vector norm. 'Sum of squares' is a case where a receive antenna is selected using a sum of squares as a vector norm, and 'inequality' is a case where a receive antenna is selected through Equation 23. Although '2Rx Sel' shows the best performance, the amount of calculation is much more than those of the other techniques. The case where a sum of squares is used as a vector norm shows performance further better than that of the case where a sum of absolute values is used.

V. Data Transmission for Multiple Receive Antennas

DPC is implemented for multiple receive antennas. QR decomposition method is used for DPC.

FIG. 11 is a flowchart illustrating a data transmission method using DPC according to an embodiment of the present invention.

Referring to FIG. 11, first, K (an integer of one or more) receivers are selected among a plurality of receivers S500. If resources for transmitting data are limited in a transmitter, a certain number of receivers can be selected among the plurality of receivers. The transmitter collects channel information through a sounding channel and can selects receivers that will receive data.

The transmitter collects channel information for the selected receivers S510. The channel information is information on channel states of the receivers, such as a channel matrix, channel vector, noise variance, and the like. The transmitter can be fed back the channel information from the receivers or extract channel information of the selected receivers from the information transmitted from the receivers.

A stack matrix $H_s$ is created using the information of the selected K receivers S520. The stack matrix $H_s$ can be created by stacking channel vectors of respective receivers.

DPC is performed using the stack matrix S530. The stack matrix is decomposed into a unitary matrix and an upper triangular matrix by performing QR decomposition on the stack matrix. A transmission rate to each of the receivers can be calculated using the upper triangular matrix and the noise variance. A channel state to each receiver can be obtained by the noise variance and the upper triangular matrix, and a modulation and coding scheme (MCS) can be determined based on such information. An SINR also can be obtained, and a transmission rate from the transmitter to the i-th receiver can be calculated.

The transmission rate is determined by an MCS level. The MCS level is determined based on a receive SINR, and an MCS level showing the highest efficiency is selected depending on the SINR. If the transmission rate is calculated, parameters such as allocated transmission power $P_i$, $b_i$, and G are calculated, and DPC is performed.

A data symbol for which DPC is performed is transmitted to each user S540.

FIG. 12 is a view showing an example of collecting channel information for the i-th receiver.

Referring to FIG. 12, a channel matrix $H_i$ for i-th receiver in an Nt×Nr MIMO system can be expressed as shown below.

$$H_i = \begin{bmatrix} h_{11} & \cdots & h_{1Nt} \\ \vdots & \ddots & \vdots \\ h_{Nr1} & \cdots & h_{NrNt} \end{bmatrix} = \begin{bmatrix} h_{1i} \\ \vdots \\ h_{Nri} \end{bmatrix} \quad \text{Math Figure 32}$$

The transmitter can use a variety of methods to collect channel information for a selected receiver.

In an embodiment, the transmitter can be fed back a channel matrix for each receiver from each receiver. The channel matrix is configured with a plurality of row vectors $h_{1i}, \ldots, h_{Nri}$, and thus the plurality of row vectors $h_{1i}, \ldots, h_{Nri}$ can be transmitted to the transmitter through sounding channels. At this point, a multiplexing scheme, such as Frequency division multiplexing (FDM), Code division multiplexing (CDM), Time division multiplexing (TDM), or the like, can be used. The receiver can calculate an appropriate weight and inform the weight to the transmitter, or the transmitter can calculate an appropriate weight and inform the weight to the receiver.

In another embodiment, the transmitter can select a specific row vector from a channel matrix or can be fed back from each receiver a row vector having superior performance among the channel matrix. The transmitter can collect channel information by selecting a row vector from the fed back channel matrix.

Alternatively, a row vector can be normalized as shown below and fed back.

$$\hat{h}_{ni} = \frac{h_{ni}}{|h_{ni}|} \text{ where } n = 1, \ldots, Nr \quad \text{Math Figure 33}$$

At this point, a ratio of relative magnitude among normalized row vectors should be known in order to combine channels. This can be determined by a noise variance normalized as shown below.

$$\hat{\sigma}_{Nn}^2 = \frac{\sigma_{Nn}^2}{|\hat{h}_{ni}|^2} \text{ where } n = 1, \ldots, Nr \quad \text{Math Figure 34}$$

Alternatively, the ratio of magnitude can be fed back without normalizing the noise variance. A channel of a receiver can be quantized to transmit the ratio of magnitude.

In another embodiment, a transmitter can be fed back a channel vector obtained using a channel matrix and a weight vector W of the i-th receiver from each receiver. Alternatively, the transmitter can create a channel vector using the channel matrix $H_i$ and the weight vector W fed back from the i-th receiver.

The channel vector of the i-th receiver can be obtained by an inner product of the channel matrix $H_i$ by the weight vector W as shown $$\tilde{h}_i = WH_i = \begin{bmatrix} \alpha \\ \vdots \\ \rho \end{bmatrix}^T \begin{bmatrix} h_{11} & \cdots & h_{1Nt} \\ \vdots & \ddots & \vdots \\ h_{Nr1} & \cdots & h_{NrNt} \end{bmatrix} = \begin{bmatrix} \alpha h_{11} + \cdots + \rho h_{Nr1} \\ \vdots \\ \alpha h_{1Nt} + \cdots + \rho h_{NrNt} \end{bmatrix}^T \quad \text{Math Figure 35}$$

where Nr denotes the number of antennas of the receiver, Nt denotes the number of antennas of the transmitter, W denotes a weight vector (1×Nr), and $H_i$ denotes a channel matrix of the i-th receiver.

The weight vector W can be created in a variety of methods. In an example, a vector with which the signal to noise ratio (SNR) of a receive channel becomes the maximum can be used as a weight vector. A channel vector can be created by applying a method such as a 'receive beam forming technique', in which a channel matrix is multiplied by a weight vector and then the channels are added.

In another example, a code $F_j$ can be selected from a plurality of codebooks as shown below.

Math Figure 36

$$W=F_j \text{ where } F=[F_1, F_2, \ldots, F_j, \ldots, F_M] \in C^{Nr \times M}$$

In another example, a code that minimizes a determinant of a matrix, satisfying the minimum square error (MSE) of a channel vector and a code selected from a codebook, can be selected as a weight vector as shown below.

$$W = \arg \min_{F_j \in F} tr(MSE(F_j, \tilde{h}_i)) \quad \text{Math Figure 38}$$

In still another example, a code that minimizes a trace of a matrix, satisfying MSE of a channel vector and a code selected from a codebook, can be selected as a weight vector as shown below.

$$W = \arg \min_{F_j \in F} \det(MSE(F_j, \tilde{h}_i)) \quad \text{Math Figure 37}$$

In still another example, a code having the largest correlation, using mutual information on a channel vector and a code selected from a codebook, can be selected as a weight vector as shown below.

$$W = \arg \max_{F_j \in F} C(F_j, \tilde{h}_i) \quad \text{Math Figure 39}$$

In this manner, a weigh vector can be selected by maximizing SNR or using performance metrics such as MSE or mutual information.

FIG. 13 is an exemplary view showing another example of collecting channel information for an i-th receiver.

Referring to FIG. 13, a transmitter can obtain a channel vector using duality of channels in order to collect channel information for a selected receiver. In a system having duality between a downlink channel and an uplink channel, an uplink channel acquired by the transmitter can be used as channel information of a downlink. Here, a system including a transmitter having two antennas and a receiver having two antennas is considered.

If it is assumed that a channel state from the receiver to the transmitter (an uplink channel) is the same as that of a channel from the transmitter to the receiver (a downlink channel), or there is an ignorable channel variation, the channel matrix for the uplink channel and the downlink channel is as shown below.

$$H_{i,DL} = H_{i,UL} \text{ where } H_{i,DL} = \begin{bmatrix} h_{11} & h_{12} \\ h_{21} & h_{22} \end{bmatrix} \quad \text{Math Figure 40}$$

A channel vector for the i-th receiver can be obtained through an inner product of the weight vector by the uplink channel as shown below.

$$\tilde{h}_i = H_{i,UL} W^T = \begin{bmatrix} h_{11} & h_{21} \\ h_{12} & h_{22} \end{bmatrix} \begin{bmatrix} \alpha \\ \beta \end{bmatrix} = \begin{bmatrix} \alpha h_{11} + \beta h_{21} \\ \alpha h_{12} + \beta h_{22} \end{bmatrix} \quad \text{Math Figure 41}$$

On the other hand, in a specific system, transmission power of a sounding channel may not be known due to power control. A normalized channel vector and a noise variance can be obtained using the calculated channel vector as shown below.

$$\hat{h}_i = \frac{\tilde{h}_i}{|\tilde{h}_i|},$$

$$\hat{\sigma}_N^2 = \frac{\sigma_N^2}{|\tilde{h}_i|^2} \quad \text{Math Figure 42}$$

Here, $\sigma_N^2$ is a noise variance.

Channel information may include a noise variance. The noise variance can be obtained using a signal received from a transmitter. The noise variance may be calculated by a preamble or a pilot signal transmitted from the transmitter.

FIG. 14 is a flowchart illustrating a data transmission method using DPC according to an embodiment of the present invention.

Referring to FIG. 14, a transmitter selects K receivers to transmit data S600. The transmitter collects channel information S610. The channel information may include a channel matrix, a channel vector, or a noise variance.

The transmitter creates a stack matrix $H_s$ by stacking the channel vectors S620. A unitary matrix Q and an upper triangular matrix R are obtained by performing QR decomposition on the created stack matrix S630. A transmission rate $Rate_i$ can be calculated for each receiver based on the noise variance and the upper triangular matrix R.

A sum transmission rate Sum Rate, which is a data transmission rate to each receiver, is calculated by summing transmission rates for respective receivers as shown below S640.

$$\text{Sum Rate} = \sum_{i=1}^{K} Rate_i \quad \text{Math Figure 43}$$

Alternatively, the Sum Rate based on a priority can be calculated as shown $$\text{Sum Rate} = \sum_{i=1}^{K} \rho_i \, Rate_i \quad \text{Math Figure 44}$$

where $\rho_i$ denotes a coefficient expressing a priority for the i-th receiver.

It is determined whether the channel vector is rearranged S650. Rearranging the channel vector means creating another stack matrix by changing the stacking order of row vectors of the stack matrix. If the created stack matrix is changed, another unitary matrix and another upper triangular matrix are extracted by QR decomposition. The transmission rate of a receiver for each user is changed since the upper triangular matrix is changed, and thus the sum transmission rate may be changed.

A certain criterion can be set to determine whether the channel vector is rearranged. In an example, the number of rearrangements of the channel vector can be set. The number of rearrangements is previously set, and the channel vector is not rearranged more than the set number. In another example, if the sum transmission rate is smaller than a certain value, the channel vector can be rearranged. In still another example, if a stack matrix created by rearrangement of the channel vector is different from previously created stack matrixes, the channel vector can be rearranged. In this manner, rearrangement of the channel vector can be repeated in order to satisfy a high sum transmission rate.

If the channel vector is rearranged, a new stack matrix is created. If the channel vector is not rearranged, the largest sum transmission rate is selected among the sum transmission rates of the previously created stack matrixes S660. If the sum transmission rate becomes the maximum, DPC is performed on data symbol ui of each user S670. Parameters, such as allocated transmission power $P_i$, $b_i$, G, and the like, are obtained in order to perform DPC. The transmitter transmits a data symbol u for which DPC is performed to each user S680.

Since the sum transmission rate is maximized, transmission resources can be efficiently used, and complexity of a receiver can be lowered by transmitting a signal from which interference is previously removed though DPC. In a MOMO system, a transmission power and a transmission rate for a user can be adaptively and efficiently set depending on the state of a channel.

VI. User Scheduling

Due to complexity of MIMO encoding scheme or the like, a transmission rate is not easy to control if there is a plurality of data streams. In addition, data streams needs to be transmitted only to certain users among a plurality of users. Accordingly, a plurality of data streams needs to be efficiently distributed and transmitted within limited radio resources.

FIG. 15 is a flowchart illustrating a data transmission method according to an embodiment of the present invention.

Referring to FIG. 15, if the number of streams to be transmitted by a transmitter is k, L is assigned as a basic number of streams transmitted by the transmitter S700. L is an arbitrary positive integer, and for example, if L is 1, one transmission stream is assigned.

A maximum metric showing optimal performance at the assigned number of streams is created S710. At this point, channel information can be used to obtain a performance metric of each stream.

The transmitter can determine a performance metric for each receiver by collecting channel information for the receiver. The channel information is information containing a channel state for each receiver, which may include, for example, a channel matrix, a channel vector, or a noise variance. The transmitter may be fed back the channel information from each receiver or extract the channel information using feedback data transmitted from each receiver.

An MCS can be determined based on such channel information. An SINR also can be known, and a performance metric, such as a transmission rate or a throughput for a stream transmitted by the transmitter, can be obtained.

If the number of transmission streams is selected, a sum metric Sm is calculated by obtaining the performance metrics for respective streams using the channel information. The sum metric Sm is a value expressed as a metric that is obtained by summing performance metrics when the streams are transmitted for a user combination S, which can be expressed as shown below.

$$Sm = \sum_{i \in S} \sum_{j=1}^{k_i} m_{ij}^S \quad \text{Math Figure 45}$$

Here, $m_{ij}^s$ is a performance metric for the i-th user and j-th stream when data is transmitted to a user combination S, and $k_i$ is the number of streams for the i-th user.

The sum metric Sm can be expressed as a product of a performance metric of each user by a priority $\rho_i$, which is shown below.

$$Sm = \sum_{i \in S} \rho_i \sum_{j=1}^{k_i} m_{ij}^S \quad \text{Math Figure 46}$$

The sum metric of priority reflects a weight of a corresponding user to a performance metric of the user and thus assigns a high weight to a user of a high priority.

The sum metric can be varied depending on a method of allocating k streams to each user. The transmitter can obtain a k maximum metric $M_k$ representing the largest possible sum metric for a limited number of streams as shown below.

$$M_k = \max_i \left\{ \sum_{i \in S_k} \sum_{j=1}^{k_i} m_{ij}^{S_k} \right\} \quad \text{Math Figure 47}$$

Here, the maximum metric represents the maximum value among the sum metrics when k streams are transmitted, and $S_k$ denotes a transmission combination to which k streams are allocated when the sum metric is the maximum.

In addition, the transmitter may select a k maximum metric $M_k$, which is the maximum among a combination of sum metrics reflecting a weight of a corresponding user to a performance metric of the user as shown below.

$$M_k = \max_i \left\{ \sum_{i \in S_k} \rho_i \sum_{j=1}^{k_i} m_{ij}^{S_k} \right\} \quad \text{Math Figure 48}$$

After selecting the k maximum $M_k$, the transmitter increases the number of streams to be transmitted by n (n is an arbitrary integer) S720. For example, if n is an integer 1, k is increased by 1 from the previous number of streams, and if n is an integer 5, the number of streams to be transmitted is increased by 5. Although it has been described to increase the number of streams to be transmitted, the number of streams also can be decreased. In other words, if n is −1, the number of streams can be decreased by 1.

After the number of transmission stream is increased, the maximum metric is created among sum metrics when the increased k streams are transmitted S730. A performance metric is obtained for each stream using channel information in order to create the maximum metric. If the number of streams is increased, data can be transmitted to more users by the increased number of streams, or more streams can be allocated to a user. The sum metrics are created for such a variety of combinations, and a k maximum metric $M_k$ having the maximum value is created among the sum metrics.

The k maximum metric $M_k$ is compared with the k−n maximum metric $M_{k-n}$ of the previous stage S740. If the k maximum metric $M_k$ is increased compared with the k−n maximum metric $M_{k-n}$ of the previous stage, the number of streams is increased by n, and the steps of creating the maximum metrics is repeated.

If the k maximum metric $M_k$ is not increased or decreased compared with the k−n maximum metric $M_{k-n}$, the number of streams is not increased any more, and data is transmitted S750. In other words, if the maximum metric representing transmission performance is increased while increasing the number of streams, the number of streams is continuously increased. However, if the maximum metric is decreased, the number of streams is not increased any more.

A plurality of streams can be transmitted depending on the maximum metric, and since the k−n maximum metric $M_{k-n}$ is the largest when there are k−n streams as describe above, a plurality of streams can be transmitted for a combination satisfying the k−n maximum metric $M_{k-n}$. Alternatively, if there are k streams, a plurality of streams can be transmitted for a combination satisfying the k−n maximum metric $M_k$.

Streams for each user are encoded depending on the maximum metric, and a constellation symbol is created by the mapper. DPC is performed by the preprocessor, and data is transmitted through the transmit antenna. As described above, a user combination is determined depending on the maximum metric, and DPC is performed based on a performance metric, such as a transmission rate or a throughput of a stream to be transmitted to each user, to transmit user data.

FIG. 16 is a flowchart illustrating a data transmission method according to an embodiment of the present invention.

Referring to FIG. 16, first, a performance metric is created for each of N (an integer of one or more) candidate streams S800. Here, the candidate streams are N streams to be transmitted from the transmitter. The performance metric is a metric representing performance for one stream, such as a transmission rate or a throughput.

After creating a performance metric for each candidate stream, a candidate stream having the maximum performance metric, which is the largest value, among the created performance metrics is selected as a first transmission stream S810. If there is one stream, the maximum metric becomes the maximum performance metric.

If the first transmission stream is selected, a combination including the first stream and one or more candidate streams among remaining candidate streams can be created S820. As for such a combination, a variety of combinations can be created depending on the number of candidate streams, and each of the combinations includes the first transmission stream.

Accordingly, performance metrics of respective streams included in the combination are calculated, and a sum metric is obtained by summing the performance metrics. A sum metric, which is a sum of performance metrics of respective streams included in a corresponding combination, is created for each combination, and a maximum metric having the maximum value is obtained from the sum metrics. A second stream, excluding the first stream, is selected from a combination satisfying the maximum metric S830. Accordingly, a combination including the first transmission stream and the second stream becomes a combination satisfying the maximum metric.

The maximum metric is an index showing transmission performance, and if the maximum metric is increased, the transmission performance is increased. Accordingly, whether the maximum metric is increased is observed to determine whether the transmission performance is increased S840.

If the transmission performance is increased, a plurality of combinations is created by adding candidate streams again. A sum metric is calculated for each of the created combinations, and the maximum metric having the largest value among the sum metrics is created. Then, the steps of selecting a third transmission stream, excluding the first stream and the second stream, are repeated.

However, if the transmission performance not increased, DPC is performed on the selected streams without adding candidate streams any more, and data is transmitted S850.

As described above, while increasing the number of streams selected from candidate streams, a combination of streams where the transmission performance is maximized is obtained. Accordingly, a combination where the transmission performance is maximized can be obtained while transmitting a plurality streams. DPC is performed on the selected combination, and thus a plurality of streams can be transmitted to multiple users.

FIG. 17 is a view showing an example of creating a transmission combination. It shows a case where one stream in maximum is allocated for a user to transmit data.

Referring to FIG. 17, first, k is set to 1, i.e., the number of streams is assigned as one. If the number of streams is assigned as one for five users, there are five cases in which one stream is assigned to each of the five users. Accordingly, a sum metric is calculated for each of the five cases, and a first maximum metric $M_1$ is created. Here, the sum metric is a sum of performance metrics, and a transmission rate is applied as the performance metric.

For example, it is assumed that a transmission rate of a first user is 0.2, of a second user is 0.3, of a third user is 0.4, of a fourth user is 1.0, and of a fifth user is 1.2. In this case, since the transmission rate of the fifth user is the highest, transmission performance can be maximized by transmitting data to the fifth user if one stream is allocated. Accordingly, a first maximum metric $M_1$ is 1.2, and at this point, combination $S_1$ is (5). Here, units are not specified to simply compare relative magnitudes of transmission rates.

The number of streams is increased by one, and two streams are transmitted. A combination for transmitting the two streams includes a combination for transmitting a stream to the fifth user. It is since that transmitting a stream to the fifth user satisfies the first maximum metric. Accordingly, there are combinations of (5, 1), (5, 2), (5, 3), and (5, 4).

Here, combination (5, 1) means that a first stream is transmitted to the fifth user, and a second stream is transmitted to the first user. However, referring to as the first and the second stream is only to distinguish streams, and it does not specify an order. If the transmission rate for the fifth user is 1.0 and the transmission rate for the first user is 0.3, the sum metric (here, a sum of transmission rates) becomes 1.3.

Combination (5, 2) means that the first stream is transmitted to the fifth user and the second stream is transmitted to the second user. Here, if the transmission rate for the fifth user is 0.5 and the transmission rate for the first user is 0.9, the sum metric becomes 1.4.

Combination (5, 3) means that one stream is transmitted to the fifth user and the other stream is transmitted to the third user. If the transmission rate for the fifth user is 0.9 and the transmission rate for the first user is 0.8, the sum metric becomes 1.7.

Combination (5, 4) means that one stream is transmitted to the fifth user and the other stream is transmitted to the fourth user. If the transmission rate for the fifth user is 0.5 and the transmission rate for the first user is 0.3, the sum metric becomes 0.8.

Accordingly, when streams are transmitted in the four combinations described above, sum metrics are compared to select a combination having the most superior performance. Combination (5, 3) of the maximum sum metric is selected, and at this point, a sum of the transmission rates 1.7 is the second maximum metric $M_2$, and combination $S_2$ is (5, 3).

Since the second maximum metric $M_2$ is larger than the first maximum metric $M_1$, the number of streams is increased by one again. If the number of streams is three, there are three combinations of (5, 3, 1), (5, 3, 2), and (5, 3, 4).

Combination (5, 3, 1) means that three streams are transmitted to the fifth user, third user, and first user respectively. If the transmission rate for the fifth user is 0.3, for the third user is 0.5, and for the first user is 0.5, the sum metric (here, a sum of transmission rates) becomes 1.3.

Combination (5, 3, 2) means that one stream is transmitted to each of the fifth user, third user, and second user. If the transmission rate for the fifth user is 0.7, for the third user is 0.5, and for the second user is 0.4, the sum metric becomes 1.6.

Combination (5, 3, 4) means that one stream is transmitted to each of the fifth user, third user, and fourth user. If the transmission rate for the fifth user is 0.3, for the third user is 0.4, and for the fourth user is 0.8, the sum metric becomes 1.5.

Accordingly, the largest sum of transmission rates 1.6 among the three combinations is the third maximum metric $M_3$. Combination $S_3$ of the third maximum metric $M_3$ is (5, 3, 2). Here, the third maximum metric $M_3$ is compared with the second maximum metric $M_2$. Since the third maximum metric value is smaller the second maximum metric value, the step of increasing the number of streams are not performed any more.

A plurality of streams can be transmitted depending on the maximum metric, and since the second maximum metric $M_2$ of the two streams is the largest, two streams can be transmitted for combination $S_2$ that satisfies the second maximum metric $M_2$. Accordingly, the streams can be transmitted to the fifth user at a transmission rate of 0.9 and to the third user at a transmission rate of 0.8. At this point, the streams are transmitted after performing DPC on the streams to be transmitted to each of the users.

In addition, if there are three streams, three streams can be transmitted for a combination satisfying the third maximum metric $M_3$.

FIG. 18 is an exemplary view showing another example of creating a transmission combination. It shows a case where a plurality of streams can be transmitted for the same user.

Here, the sum metric is a sum of performance metrics, and a transmission rate is applied as the performance metric.

Referring to FIG. 18, first, the basic number of streams is one, and thus k is set to 1. If there are five users to receive data, and the number of streams is one, there are five cases in which one stream is transmitted to each of the users. It is assumed that a transmission rate for transmitting data to a first user $r_{11}$ is 1.0, to a second user $r_{21}$ is 1.2, to a third user $r_{31}$ is 0.5, to a fourth user $r_{41}$ is 0.4, and to a fifth user $r_{51}$ is 0.2. Here, $r_{ij}$ is the transmission rate of the j-th stream for the i-th user. Accordingly, a first maximum metric $M_1$ is 1.2 when one stream is transmitted to the second user, and combination $S_1$ is (2). Here, units are not specified to simply compare relative magnitudes of transmission rates.

The number of streams is increased by one, and k is set to 2. In the case of two streams, a combination for transmitting the two streams includes a combination for transmitting a stream to the second user. It is since that combination $S_1$ showing the maximum performance when one stream is transmitted is (2). However, since a plurality of streams can be assigned and transmitted to the same user, combinations including the second user are (2, 1), (2, 2), (2, 3), (2, 4), and (2, 5). Here, combination (2, 2) means that a first stream is allocated to the second user, and a second stream is also allocated to the second user, which means that two streams are allocated to the second user. However, referring to as the first and the second stream is only to distinguish streams, and it does not specify an order.

Accordingly, transmission rates for the combinations of the five cases will be described respectively. In combination (2, 1), if the transmission rate of the first stream for the second user $r_{21}$ is 0.7 and the transmission rate of the second stream for the first user $r_{12}$ is 0.6, the sum metric (a sum of the transmission rates) becomes 1.3. In combination (2, 2), if the transmission rate of the first stream for the second user $r_{21}$ is 0.5 and the transmission rate of the second stream for the second user $r_{22}$ is 0.6, the sum metric becomes 1.1. In combination (2, 3), if the transmission rate of the first stream for the second user $r_{21}$ is 0.4 and the transmission rate of the second stream for the third user $r_{32}$ is 0.5, the sum metric becomes 0.9. In combination (2, 4), if the transmission rate of the first stream for the second user $r_{21}$ is 0.7 and the transmission rate of the second stream for the fourth user $r_{42}$ is 1.0, the sum metric becomes 1.7. In combination (2, 5), if the transmission rate of the first stream for the second user $r_{21}$ is 0.3 and the transmission rate of the second stream for the fifth user $r_{52}$ is 0.4, the sum metric becomes 0.7.

Accordingly, the maximum value among the sums of transmission rates for the combinations is 1.7 of the sum metric for combination (2, 4). In the case where two streams are transmitted, combination $S_2$ for transmitting streams to the second user and the third user has the second maximum metric $M_2$.

The second maximum metric $M_2$ is compared with the first maximum metric $M_1$. Since the second maximum metric $M_2$ is larger than the first maximum metric $M_1$, the number of streams is increased by one again, and the steps of calculating transmission rates are repeated.

The number of streams is increased by one, and thus k is set to 3. In the case of three streams, a combination for transmitting the three streams includes a combination for transmitting a stream to the second user and another stream the fourth user. However, since a plurality of streams can be allocated and transmitted to the same user, combinations including the second user and the fourth user are (2, 4, 1), (2, 4, 2), (2, 4, 3), (2, 4, 4), and (2, 4, 5).

In the case where streams are allocated to the second, fourth, and first users, when the first stream is transmitted to the second user, the second stream to the fourth user, and the third stream to the first user, it is assumed that respective transmission rate $r_{21}$, $r_{42}$, and $r_{13}$ are (0.4, 0.3, 0.4). The sum metric becomes 1.1.

In combination (2, 4, 2), two streams are allocated to the second user, and one stream is allocated to the fourth user. When the first stream is transmitted to the second user, the second stream is transmitted to the fourth user, and the third stream is transmitted to the second user, it is assumed that respective transmission rates $r_{21}$, $r_{42}$, and $r_{23}$ are (0.4, 0.5, 0.7). Here, since two streams are allocated to the second user, the transmission rate for the third stream can be represented as $r_{23}$. The sum metric, which is a sum metric that is a sum of all transmission rates, becomes 1.6.

In combination (2, 4, 3), the first stream is transmitted to the second user, the second stream is transmitted to the fourth user, and the third stream is transmitted to the third user. It is assumed that respective transmission rates $r_{21}$, $r_{42}$, and $r_{33}$ are (0.2, 0.5, 0.5). The sum metric becomes 1.2.

In combination (2, 4, 4), the first stream is transmitted to the second user, the second and the third streams are transmitted to the fourth user. It is assumed that respective transmission rates $r_{21}$, $r_{42}$ and $r_{43}$ are (0.6, 0.4, 0.3). The sum metric becomes 1.3.

In combination (2, 4, 5), the first stream is transmitted to the second user, the second stream is transmitted to the fourth user, and the third stream is transmitted to the fifth user. It is assumed that respective transmission rates $r_{21}$, $r_{42}$, and $r_{53}$ are (0.7, 0.3, 0.4). The sum metric becomes 1.4.

Accordingly, the maximum value 1.6 among the sums of transmission rates is the third maximum metric $M_3$, and at this point, combination $S_3$ is (2, 4, 2). If the third maximum metric $M_3$ is compared with the second maximum metric $M_2$, the third maximum metric value is smaller the second maximum metric value.

Accordingly, the number of streams is not increased any more, and the streams are transmitted. In order to transmit a plurality of streams, the plurality of streams is encoded, mapped to constellation symbols, and transmitted after performing DPC.

A plurality of streams can be transmitted depending on the maximum metric, and since the second maximum metric $M_2$ of the two streams is the largest, two streams can be transmitted for combination $S_2$ that satisfies the second maximum metric $M_2$. Accordingly, the streams can be transmitted to the fifth user at a transmission rate of 0.9 and to the third user at a transmission rate of 0.8, and the streams are transmitted after performing DPC on the streams to be transmitted to each of the users.

In addition, if there are three streams, three streams can be transmitted for a combination satisfying the third maximum metric $M_3$.

The maximum metric with which the transmission performance is maximized is obtained while increasing the number of streams. Accordingly, the transmission performance can be maximized even when the number of streams is variable, and thus it is advantageous for a variable radio communication environment. Since the transmission rate can be adjusted depending on the state of a channel by using channel information, a transmission rate can be enhanced in a time-varying radio communication system. Since a plurality of streams is efficiently scheduled and transmitted based on user combinations, the transmission rate can be enhanced.

VII. Demapping Method

If a user signal is transmitted using DPC, a receiver performs a modulo operation, and errors can be occurred in the user signal by performing the modulo operation. Accordingly, it needs to reduce the errors generated when demapping the user signal at the receiver.

FIG. 19 is a block diagram showing a transmitter and a receiver according to an embodiment of the present invention.

Referring to FIG. 19, the transmitter 700 comprises an encoder 710, a mapper 720, and a DPC unit 730. The encoder 710 encodes inputted information bits through a channel code and creates coded data. The mapper 720 maps the coded data to a data symbol w representing a location on a signal constellation.

The DPC unit 750 performs DPC on the data symbol w and creates a transmission signal M. The DPC unit 750 includes an interference subtractor 730 and a modulo operator 740. The interference subtractor 730 subtracts interference S previously known to the transmitter 700 from the mapped data symbol w. If it is assumed that the data symbol transmitted to a user is w, and the interference S previously known to the transmitter 700 is S, the subtractor 730 subtracts interference S by performing w-S.

The form of a transmission signal set needs to be modified so that the DPC can be operated for any interference S. It is since that if interference S is large, it can exceed transmit power constraint. Considering this, a modulo operation for modifying the form of the transmission signal set is performed. The modulo operator 740 performs a modulo operation on the output of the interference subtractor 730 w-S and outputs a transmission signal M. For example, when a QPSK symbol has a form of $\pm 1 \pm j$ in a constellation using QPSK, the $-1+j$ operates like a symbol, such as $-5-3j$, $-5+j$, $+3+j$, $+3+5j$, or the like, so that any interference S can be coped with.

The transmission signal M outputted from the modulo operator 740 is as shown

Math Figure 49

$$M=(w-S)_{mod}=(w-S)+aL+jbL$$

where a and b are integers, and the size of L is a half of a modulo box.

The transmitter 700 transmits a user signal after previously subtracting the interference signal, and at this point, since transmission power can be increased due to the interference, the transmission power can be constrained through a modulo operation.

A receiver 800 comprises a modulo operator 830, a demapper 820, and decoder 10. The modulo operator 830 performs a modulo operation on an input signal R and outputs a receive signal Y. The transmission signal M is mixed with a noise N and an interference S while passing through a channel, and thus the input signal R becomes R=M+S+N. Accordingly, the input signal R can be expressed as shown below.

Math Figure 50

$$R=M+S+N=w+N+aL+jbL$$

If a modulo operation is performed on the input signal R, a receive signal can be obtained as shown Math Figure 51

$$Y=R_{mod}=w+N+cL+jdL$$

where c and d are integers, and the size of L is a half of a modulo box. The modulo operator 830 moves the receive signal Y to a rectangular modulo box whose horizontal and vertical lengths are respectively 2L.

The demapper 820 demaps the receive signal Y. The demapper 820 can estimate the received signal as a point among coordinates on a constellation map and convert information of a symbol level to a bit level. The decoder 810 decodes the symbol demapped by the demapper 820 to restore original information bits.

FIG. 20 is a view showing a demapping method according to an embodiment of the present invention.

Referring to FIG. 20, a modulo operation is performed on a received signal S900. The receiver performs a modulo operation on an input signal R and outputs a receive signal Y.

A candidate function value is created for the receive signal Y on which a modulo operation is performed using a candidate constellation point on an extended constellation map, and a maximum function value is selected among the created candidate function values S910. The candidate function value is a value representing the possibility of the receive signal Y to correspond to a candidate constellation point on the extended constellation map. The extended constellation map is a constellation map including extended constellation points, as well as basic constellation points on a basic constellation map. The maximum function value is a value largest among the candidate function values and is selected among candidate function values.

FIG. 21 is a view showing an example of an extended constellation. It uses a basic constellation of 16-QAM.

Referring to FIG. 21, if it is assumed that a constellation map comprising a plurality of constellation points corresponding to symbols in a modulo box B is a basic constellation map, the basic constellation map in 16-QAM is a constellation map comprising 16 constellation points in the modulo box B.

The extended constellation map includes basic constellation points of the basic constellation and extended constellation points. The extended constellation points are constellation points excluding the basic constellation points. The modulo box B is a border line indicating a region where the basic constellation points are located.

As an example of creating the constellation points, the modulo box is repeatedly arranged adjacent to the modulo box B of the basic constellation map. Eight modulo boxes adjacent to one basic constellation map can be arranged surrounding the basic constellation map, and arrangement of constellation points contained in the eight modulo boxes is the same as the arrangement of constellation points on the basic constellation map. Here, repeating a modulo box means copying the constellation points within the modulo box.

Here, constellation points selected among the constellation points contained in the eight modulo boxes can be extended constellation points. For example, four modulo boxes are arranged on the upper, lower, left, and right sides, and four constellation points close to the origin point of the constellation map are selected from the constellation points located within each modulo box, and thus total 16 extended constellation points can be obtained.

For another example, constellation points, among the basic constellation points, at a near distance from the constellation points around the border line can be selected as extended constellation points. Accordingly, extended constellation points located close to the modulo box of the basic constellation map can be selected.

For still another example, basic constellation points can be arranged repeating up and down or left and right. To be arranged by repetition means that the basic constellation points are copied in the directions of up and down or left and right at regular intervals maintaining the same arrangement. Accordingly, one or more extended constellation points can be selected among the copied basic constellation points.

As described above, an extended constellation map can be obtained by creating one or more extended constellation points and arranging the extended constellation points on a constellation map together with the basic constellation points. In creating the extended constellation map, a basic constellation map of m-PSK or m-QAM, such as BPSK, QPSK, 8-QAM, 16-QAM, 64-QAM, 128-QAM, 256-QAM, or the like, can be used. In addition, in the basic constellation map, positions of the constellation points corresponding to a bit array can be varied on the constellation map.

FIG. 22 is a view showing an example of arranging candidate constellation points on the extended constellation of FIG. 21.

Referring to FIG. 22, an extended constellation map contains basic constellation points on a basic constellation map and extended constellation points located close to the modulo box B. Eight modulo boxes adjacent to one basic constellation map are arranged surrounding the basic constellation map, and arrangement of constellation points contained in the eight modulo boxes is the same as the arrangement of constellation points on the basic constellation map.

One or more constellation points representing the same bit array are referred to as candidate constellation points, and such candidate constellation points may include one or more constellation points on the extended constellation map.

A side constellation point located on the side, not on the corner, among the basic constellation points, can create an extended constellation point. For example, the basic constellation point located on the right side for representing bit array $(0010)_0$ can create and arrange an extended constellation point located on the left side for representing bit array $(0010)_1$. It is since that although the modulo box B is repeatedly arranged, the arrangement of the constellation points within the modulo box B is the same as the arrangement of the constellation points on the basic constellation map. Accordingly, the candidate constellation points representing bit array (0010) includes the basic constellation point representing bit array $(0010)_0$ and the extended constellation point representing bit array $(0010)_1$.

A corner constellation point located on the corner can create three extended constellation points. For example, the basic constellation point located on the right upper corner for representing bit array $(0011)_0$ can create three extended constellation points, respectively located at the left upper portion for representing bit array $(0011)_1$. Accordingly, the candidate constellation points representing bit array (0011) includes the basic constellation point representing bit array $(0011)_0$ and the three extended constellation points representing bit array $(0011)_1$, bit array $(0011)_2$, and bit array $(0011)_3$.

A constellation point that is neither a corner constellation point nor a side constellation point among the basic constellation point is an inner constellation point and does not create an extended constellation point. For example, the basic constellation point located close to the origin point of the constellation map for representing bit array $(0000)_0$ does not creates an extended constellation point, since although the modulo box is repeatedly arranged, the arrangement of the constellation points within the modulo box B is the same as the arrangement of the constellation points on the basic constellation map. Accordingly, the candidate constellation points representing bit array (0000) includes only the basic constellation point representing bit array $(0000)_0$.

As described above, candidate constellation points are one or more constellation points representing the same bit array and may include the basic constellation point and extended constellation points. However, if there is not an extended constellation point representing a specific bit array, only the basic constellation point can be a candidate constellation point.

FIG. 23 is an exemplary view showing an extended constellation map in QPSK. Referring to FIG. 23, on a general QPSK constellation map, a symbol is mapped onto any one of four points in the modulo box B, which has horizontal and vertical lengths of 2L. The basic constellation map in QPSK is a constellation map comprising four basic constellation points within the modulo box B.

A symbol mapped onto the basic constellation corresponds to information of two bits in total, one bit for the real number part I and one bit for the imaginary number part Q. For example, considered is a case where the real axis affects the front bit and the imaginary axis affects the rear bit. In other words, if the front bit is zero, the real value of the signal is A, and if the front bit is one, the real value of the signal is −A. Contrarily, if the rear bit is zero, the imaginary value of the signal is A, and if the rear bit is one, the imaginary value of the signal is −A. That a basic constellation point located on the basic constellation map corresponds to a specific bit array is an example, and the same bit array can be corresponded to another basic constellation point on the basic constellation map depending on a situation.

An extended constellation map contains basic constellation points on the basic constellation map and extended constellation points. The extended constellation map of FIG. 23 is created by repeatedly copying the modulo box of the basic constellation map to be arranged adjacent to the modulo box of the basic constellation map and selecting extended constellation points arranged close to the constellation points of the basic constellation map.

The extended constellation map has candidate constellation points, i.e., one or more constellation points corresponding to the same bit array. Although the modulo box B of the basic constellation map has one constellation point corresponding to a bit array to be demapped, one or more constellation points corresponding to the bit array to be demapped are located on the extended constellation map. For example, if a bit array to be demapped is (00), there are four candidate constellation points of $(00)_0$, $(00)_1$, $(00)_2$, and $(00)_3$ on the extended constellation map. If a bit array to be demapped is (11), there are four candidate constellation points of $(11)_0$, $(11)_1$, $(11)_2$, and $(11)_3$ on the extended constellation map.

Using the candidate constellation points on the extended constellation map, a candidate function value $P_i$ can be calculated as shown $$P_o[y|x=\alpha] = \frac{1}{\sqrt{2\pi}\sigma} \exp\left(-\frac{1}{2}\frac{|y-h(\alpha)_i|^2}{\sigma^2}\right) \quad \text{Math Figure 52}$$

where $\sigma^2$ denotes a noise variance, y denotes a receive signal on which a modulo operation is performed, and h denotes a channel response. The candidate function value $P_i$ expresses, in number, probability of the receive signal, on which a modulo operation is performed, to correspond to a specific bit array.

The candidate function value $P_i$ can be obtained by substituting a coordinate of a candidate constellation point $(\alpha)_i$ satisfying the bit array of $\alpha$. For example, if bit array $\alpha$ to be demapped is (00), there are four candidate constellation points of $(00)_0$, $(00)_1$, $(00)_2$, and $(00)_3$, in which $(00)_0$ is the basic constellation point, and $(00)_1$, $(00)_2$, and $(00)_3$ are extended constellation points. Accordingly, four candidate function values $P_i$ can be created based on the four constellation points.

If a bit array $\alpha$ to be demapped is (00), candidate constellation points corresponding to the bit array can be four constellation points of $(00)_0$, $(00)_1$, $(00)_2$, and $(00)_3$. The candidate function value Pi is obtained by substituting a value of $(\alpha)_i$ that is a coordinate of each candidate constellation point on the constellation map. Here, if $y=h(\alpha)_i$ is satisfied, the candidate function value $P_i$ can be the maximum. If the candidate function value $P_i$ is the maximum, it means that a constellation symbol transmitted from the transmitter is most probable to be a specific bit array corresponding to a relevant candidate constellation point. Accordingly, if a candidate function values Pi is calculated based on a candidate constellation point most approximately satisfying $y=h(\alpha)_i$, among one or more candidate constellation points on the extended constellation map, the constellation point is most probable to be the specific bit array.

The maximum function value $P_{max}$ among the created candidate function values $P_i$ can be obtained as shown below.

Math Figure 53

$$P_{max}[y|x=\alpha] = \max_{(\alpha)_i} P_i$$

Referring to FIG. 20 again, a log-likelihood ratio (LLR) is calculated using the maximum function value $P_{max}$ S920. An output of the demapper 820 can be expressed as a liability or probability value for 1 and 0 in an input bit array, not expressed as a binary digit. Accordingly, an LLR that expresses reliability or probability of 1 or 0 for the k-th bit can be calculated as shown below.

$$LLR(b_{R,k}) = \log \frac{\sum_{\alpha \in S_{R,k}^1} P_{max}[y|x=\alpha]}{\sum_{\alpha \in S_{R,k}^0} P_{max}[y|x=\alpha]} \quad \text{Math Figure 54}$$

Here, $\alpha$ is one of coordinates of a constellation symbol on a constellation map, $\alpha \in S_{R,k}^0$ is a symbol where 0 is indicated by the k-th bit that is mapped to a real value of $\alpha$, and $\alpha \in S_{R,k}^1$ is a symbol where 1 is indicated by the k-th bit that is mapped to a real value of $\alpha$. The denominator denotes a sum of maximum function values with which the k-th bit becomes 0, in which $\alpha$, i.e., one of coordinates of a constellation symbol, is mapped onto the k-th bit. The numerator denotes a sum of maximum function values with which the k-th bit becomes 1, in which $\alpha$, i.e., one of coordinates of a constellation symbol, is mapped onto the k-th bit. Accordingly, if the denominator is increased, the LLR is decreased, and if numerator is increased, the LLR is increased. If the LLR is small, the probability of the k-th bit to be 0 is high, in which $\alpha$, i.e., one of coordinates of a constellation symbol, is mapped onto the k-th bit, and if LLR is large, the probability of the k-th bit to be 1 is high, in which $\alpha$, i.e., one of coordinates of a constellation symbol, is mapped onto the k-th bit.

The maximum function value $P_{max}$ can be calculated using Equation 53. Using candidate constellation points on the extended constellation map corresponding to a specific bit array, the maximum function value $P_{max}$ satisfying Equation 53 can be calculated.

For example, an LLR of the first bit can be obtained as shown below when demapping is performed on a symbol that is mapped in QPSK.

$$LLR(b_{R,1}) = \log \frac{P_{max}[y|x=(10)] + P_{max}[y|x=(11)]}{P_{max}[y|x=(00)] + P_{max}[y|x=(01)]}$$ Math Figure 55

In calculating the LLR of the first bit, the denominator is a sum of maximum function values Pmax for bit arrays (00) and (01) whose first bit is respectively 0, and the numerator is a sum of maximum function values $P_{max}$ for bit arrays (10) and (11) whose first bit is respectively 1. Then, a logarithm is applied to calculate the LLR. If probability of the first bit to be 0 is high, the LLR is decreased, and if probability of the first bit to be 1 is high, the LLR is increased.

LLR of the second bit can be calculated as shown below.

$$LLR(b_{R,2}) = \log \frac{P_{max}[y|x=(01)] + P_{max}[y|x=(11)]}{P_{max}[y|x=(00)] + P_{max}[y|x=(10)]}$$ Math Figure 56

In calculating the LLR of the second bit, the denominator is a sum of maximum function values $P_{max}$ for bit arrays (00) and (10) whose second bit is respectively 0, and the numerator is a sum of maximum function values $P_{max}$ for bit arrays (01) and (11) whose second bit is respectively 1. Then, a logarithm is applied to calculate the LLR. If probability of the second bit to be 0 is high, the LLR is decreased, and if probability of the second bit to be 1 is high, the LLR is increased.

Accordingly, if the $LLR(b_{R,1})$ and $LLR(b_{R,2})$ are calculated, a ratio of reliability or probability for the first bit and the second bit to be 0 or 1 can be calculated. Accordingly, the demapper can perform demapping a receive signal on the constellation map through the $LLR(b_{R,1})$ and $LLR(b_{R,2})$.

Maximum function values $P_{max}$ are calculated using candidate constellation points of the extended constellation map, and LLR values are calculated based on the maximum function values to perform demapping. By introducing an extended constellation map, candidate function values $P_i$, which are calculated by Equation 52, can be further correctly calculated. In addition, the error that is occurred when a constellation symbol is moved into the modulo box by a modulo operation can be reduced by applying one or more candidate constellation points and calculating the maximum function values $P_{max}$. Accordingly, a relatively correct LLR value can be calculated when calculating the LLR using the maximum function values $P_{max}$.

Therefore, the receiver extracts a relatively correct location of a receive signal on the constellation map derived by a modulo operation, and thus can demap a constellation symbol transmitted from the transmitter. Accordingly, degradation of performance is reduced at the demapper, and performance can be increase.

Table 1 shows signal to noise ratios (SNR) with respect to MCS levels for satisfying a 10% frame error rate (FER). SNR values (dB) required when demapping is performed based on a conventional technique are compared with SNR values required when demapping is performed based on the proposed technique.

TABLE 1

| MCS level | Conventional(dB) | Proposed(dB) | Difference(dB) |
|---|---|---|---|
| MCS 0 (QPSK, 1/8) | 3.4603 | 2.3091 | 1.1512 |
| MCS 1 (QPSK, 1/6) | 4.0801 | 2.6205 | 1.4596 |
| MCS 2 (QPSK, 1/4) | 5.1633 | 3.4794 | 1.6839 |
| MCS 3 (QPSK, 1/3) | 4.4745 | 4.0797 | 1.6442 |
| MCS 4 (QPSK, 3/7) | 6.6984 | 4.6930 | 2.0055 |
| MCS 5 (QPSK, 1/2) | 6.3100 | 5.3589 | 2.2005 |
| MCS 6 (QPSK, 5/9) | 7.8616 | 5.5531 | 2.3085 |
| MCS 7 (QPSK, 5/8) | 6.9962 | 6.3201 | 1.9255 |
| MCS 8 (QPSK, 7/10) | 9.0454 | 6.6986 | 2.3467 |
| MCS 9 (QPSK, 3/4) | 9.8067 | 7.3389 | 2.4678 |
| MCS 10 (16QAM, 4/9) | 12.7948 | 8.0465 | 4.7483 |
| MCS 11 (16QAM, 1/2) | 13.5300 | 8.5738 | 4.9562 |
| MCS 12 (16QAM, 13/24) | 14.2228 | 9.2461 | 4.9767 |
| MCS 13 (16QAM, 5/8) | 15.4059 | 10.2171 | 5.1888 |
| MCS 14 (16QAM, 2/3) | 16.0129 | 10.2391 | 5.7739 |
| MCS 15 (16QAM, 3/4) | 17.3048 | 11.0832 | 6.2215 |
| MCS 16 (16QAM, 5/6) | 18.0120 | 12.7021 | 5.3099 |
| MCS 17 (64QAM, 3/5) | 22.6151 | 13.8120 | 8.8031 |
| MCS 18 (64QAM, 5/8) | 21.9743 | 14.3230 | 7.6513 |
| MCS 19 (64QAM, 17/25) | 22.4824 | 15.3110 | 7.1714 |
| MCS 20 (64QAM, 3/4) | 23.3498 | 16.0875 | 7.2623 |
| MCS 21 (64QAM, 5/6) | 23.4619 | 17.6534 | 5.8086 |

Referring to Table 1, 22 MCS levels have different modulation schemes and code rates from one another. A transmission rate is determined by an MCS level, and the MCS level is determined by a receive SNR. An MCS level showing the highest efficiency is selected based on the SNR.

SNR values of the technique proposed to satisfy the 10% frame error rate in all MCS levels are lower than SNR values of the conventional technique. It is understood that if the proposed technique according to an embodiment of the present invention is performed under the condition of satisfying the same frame error rate, SNR values further lower than those of the conventional technique can be obtained.

For example, in MCS level 0, an SNR of about 3.46 dB is required in the conventional technique, whereas an SNR of 2.31 dB is required in the proposed technique. Accordingly, it is understood that performance of about 1.15 dB is improved in the proposed technique. In MCS level 17, performance in SNR is improved by about 8.80 dB in the proposed technique compared with the conventional technique. It is understood that performance is improved by about 4.23 dB in average.

As described above, SNRs for satisfying the 10% frame error rate are relatively lowered by the proposed technique compared with the conventional technique. It is understood that in order to satisfy the same frame error rate, the conventional technique requires relatively the higher SNR. In other words, it is understood that performance degradation can be reduced more by performing demapping in the proposed technique relative than by performing demapping in the conventional technique. It is since that function values are calculated using only basic constellation points on the basic constellation map in the conventional technique.

The function value P obtained by performing DPC can be calculated as shown below.

$$P[y|x=\alpha] = \frac{1}{\sqrt{2\pi}\sigma} \exp\left(-\frac{1}{2}\frac{|y-h\alpha|^2}{\sigma^2}\right)$$ Math Figure 57

In the Equation 57, if a modulo operation is performed for an input signal, a receive signal y moved into the modulo box is used. However, a receive signal obtained by performing a modulo operation can be mixed with noises and may move to a position other than a position on the constellation map when the signal is transmitted. In other words, although the receive signal is moved within the modulo box by a modulo operation, the receive signal can be moved to a position other than a position of a constellation symbol when the receive signal is transmitted, and thus the function value P calculated by Equation 57 can be changed. Therefore, a significant error can be occurred when an LLR value is calculated.

Hereinafter, the error that is occurred when demapping a transmission symbol transmitted through DPC will be described in detail.

FIG. 24 is a graph showing a receive signal after performing a modulo operation on a symbol mapped in QPSK when noises form a Gaussian distribution. The figure shows a result of a simulation performed on the distribution of real values for a signal received after performing a modulo operation, when the transmitter transmits a symbol of (00), and SNR is 5 dB. Here, the value of A is ½, and thus A has a value of about 0.707. Here, the horizontal axis shows a real value on a constellation map, and the vertical axis shows a receive signal on which a modulo operation is performed.

Referring to FIG. 24, symbol (00) is mixed with noises of Gaussian distribution while being transmitted. A modulo operation is performed on the receive signal containing the noises. After performing the modulo operation, the noises do not have a Gaussian distribution any more, since a receive signal moved out of the modulo box is forcibly moved into the modulo box due to the modulo operation.

Accordingly, a receive signal having a Gaussian distribution is obtained in the range of 0.5 from about 0.07, which is a value of A, and the receive signal does not have a Gaussian distribution if it goes out of the range. In addition, it is shown that the right end portion is forcibly cut off due to the modulo operation.

As described, the LLR has the highest value when the real value of a signal received through a modulo operation is A, and if the real value of the received signal goes out of A, the value of LLR is lowered like a Gaussian distribution. However, it is understood that since the left side of the graph does not have a Gaussian distribution, the graph has a tail where the LLR of the receive signal is increased again after becoming zero.

FIG. 25 is a view showing coordinates on a constellation map for signals that receive symbols mapped in QPSK. The figure shows real values and imaginary values of data obtained after performing a modulo operation on a receive signal, when the transmitter transmits a symbol of (00), and SNR is 5 dB. Here, the horizontal axis shows a coordinate of a real value on the constellation map, and the vertical axis shows a coordinate of an imaginary value on the constellation map.

Referring to FIG. 25, if the noises have a Gaussian distribution, the coordinates of symbols obtained after performing a modulo operation at the receiver generally have a form of a circle from coordinate (A, A) to which symbol (0, 0) is mapped. Here, the value of A is about 0.707. However, if a signal is received after performing a modulo operation, a portion of the circle is cut off from the circle centering on coordinate (A, A) and moves to another position. It is since that some of signals, received in the form of a circle centering on coordinate (A, A), exist out of the modulo box when a modulo operation is performed, and if the modulo operation is performed on the signals, the coordinates of the received signals is moved within the modulo box, i.e., a border line.

In the distribution of received signals, it is shown that a portion of the right side and the upper side is cut off from the circle centering on coordinate (A, A). The cut off portion of the right side moves to the left top by a modulo operation, and the cut off portion of the upper side of the circle centering on coordinate (A, A) moves to the right bottom. For example, receive signals positioned out of the right upper corner of the modulo box can be moved to three positions due to the modulo operation. In other words, due to the modulo operation, the receive signals positioned out of the right upper corner of the modulo box can be moved to the right bottom, left top, and left bottom.

In this manner, if a symbol on the constellation map transmitted from the transmitter is mixed with noises, the receiver moves the received symbol within the modulo box through a modulo operation. However, the received symbol is moved to a position different from that of a symbol of the transmitted signal while a modulo operation is performed, and the receiver may demap the received symbol as a symbol quite different from the transmitted symbol. If an LLR is calculated in this circumstance, degradation in performance can be occurred.

However, according to the present invention, extended constellation points are employed, together with basic constellation points, using an extended constellation map. In addition, candidate function values Pi, representing probability of a receive signal to correspond to a candidate constellation point, are obtained using the candidate constellation points, and the largest function value is selected as a maximum function value Pmax. Accordingly, although a receive signal is moved to another position from the modulo box by a modulo operation, a relatively correct maximum function value Pmax can be calculated using candidate constellation points corresponding to the position. Therefore, errors on the LLR value can be reduced, and performance degradation of a demapped bit array can be decreased.

The steps of a method described in connection with the embodiments disclosed herein may be implemented by hardware, software or a combination thereof. The hardware may be implemented by an application specific integrated circuit (ASIC) that is designed to perform the above function, a digital signal processing (DSP), a programmable logic device (PLD), a field programmable gate array (FPGA), a processor, a controller, a microprocessor, the other electronic unit, or a combination thereof. A module for performing the above function may implement the software. The software may be stored in a memory unit and executed by a processor. The memory unit or the processor may employ a variety of means that is well known to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The invention claimed is:

1. A data transmission method for multiple users having multiple receive antennas, the method comprising:
   selecting a receive antenna among the multiple receive antennas for each user;
   performing DPC (Dirty Paper Coding) from the multiple transmit antennas to the receive antenna; and
   transmitting a transmission signal on which the DPC is performed, wherein the receive antenna is selected for each user and the receive antenna has a largest channel vector norm from a transmit antenna to receive antennas.

2. A data transmission method comprising:

calculating a transmission rate at which data is transmitted to each receiver using channel information fed back from a plurality of receivers;

performing DPC on a transmission symbol to be transmitted to each receiver based on the calculated transmission rate; and transmitting a transmission signal on which the DPC is performed, wherein the channel information includes a channel vector created by an inner product of a channel matrix of each receiver by a weight vector.

3. A data transmission method for selecting at least one transmission stream from N candidate streams (N is an integer of one or more) and transmitting the selected transmission stream, the method comprising:

calculating a performance metric for each of the candidate streams;

selecting a candidate stream having a maximum performance metric among the performance indexes as a first transmission stream;

selecting a candidate stream having a largest sum of performance metrics of respective streams as a second transmission stream, from a combination containing the first transmission stream and at least one or more candidate streams among the other candidate streams; and transmitting the first transmission stream and the second transmission stream.

4. The method according to claim 3, further comprising:

selecting a candidate stream having a largest sum of performance metrics of respective streams as a third transmission stream, from a combination containing the first transmission stream, the second transmission stream, and at least one or more candidate streams among the other candidate streams.

5. The method according to claim 3, wherein the performance metric is a transmission rate or a throughput of each of the streams.

6. A data transmission method for multiple users having multiple receive antennas, the method comprising:

obtaining a user combination where a sum of performance metrics of respective streams becomes largest, for a plurality of streams to be transmitted to multiple users;

performing pre-coding on a stream to be transmitted to each user belonging to the user combination; and transmitting a signal on which the pre-coding is performed.

7. The method according to claim 6, wherein at least one or more streams are allocated to each user belonging to the user combination.

* * * * *